(12) United States Patent
de Vries et al.

(10) Patent No.: US 8,359,591 B2
(45) Date of Patent: Jan. 22, 2013

(54) STREAMING FROM A MEDIA DEVICE

(75) Inventors: Jeffrey de Vries, Sunnyvale, CA (US); Greg Zavertnik, San Jose, CA (US); Ann Hubbell, Los Altos Hills, CA (US)

(73) Assignee: StreamTheory, Inc., Irvine, CA (US)

( * ) Notice: Subject to any disclaimer, the term of this patent is extended or adjusted under 35 U.S.C. 154(b) by 1690 days.

(21) Appl. No.: 11/273,862

(22) Filed: Nov. 14, 2005

(65) Prior Publication Data

US 2006/0123185 A1 Jun. 8, 2006

Related U.S. Application Data

(60) Provisional application No. 60/627,502, filed on Nov. 13, 2004, provisional application No. 60/628,517, filed on Nov. 15, 2004.

(51) Int. Cl.
*G06F 9/445* (2006.01)

(52) U.S. Cl. ......... 717/172; 717/173; 717/177; 717/178

(58) Field of Classification Search ................ None
See application file for complete search history.

(56) References Cited

U.S. PATENT DOCUMENTS

| | | | |
|---|---|---|---|
| 4,796,220 A | 1/1989 | Wolfe |
| 5,063,500 A | 11/1991 | Shorter |
| 5,109,413 A | 4/1992 | Comeford et al. |
| 5,210,850 A | 5/1993 | Kelly et al. |
| 5,293,556 A | 3/1994 | Hill et al. |
| 5,442,791 A | 8/1995 | Wrabetz et al. |
| 5,495,411 A | 2/1996 | Ananda |
| 5,547,202 A | 8/1996 | Tsumura |
| 5,548,645 A | 8/1996 | Ananda |
| 5,652,887 A | 7/1997 | Dewey et al. |
| 5,666,293 A | 9/1997 | Metz et al. |
| 5,696,965 A | 12/1997 | Dedrick |
| 5,701,427 A | 12/1997 | Lathrop |
| 5,706,440 A | 1/1998 | Compliment et al. |
| 5,715,403 A | 2/1998 | Stefik |
| 5,764,906 A | 6/1998 | Edelstein et al. |
| 5,765,152 A | 6/1998 | Erickson |
| 5,768,528 A | 6/1998 | Stumm |
| 5,768,539 A | 6/1998 | Metz et al. |

(Continued)

FOREIGN PATENT DOCUMENTS

| | | |
|---|---|---|
| EP | 0 813 325 A2 | 12/1997 |
| EP | 0 658 837 B1 | 6/2000 |

(Continued)

OTHER PUBLICATIONS

Microsoft, "Understanding Universal Plug and Play", pp. 1-39, Feb. 6, 2000.

(Continued)

*Primary Examiner* — Chuck Kendall

(74) *Attorney, Agent, or Firm* — Sheppard Mullin Richter & Hampton LLP

(57) ABSTRACT

A technique for streaming from a media device involves enabling a local device to function as a streaming server. An example of a method according to the technique includes inserting a removable storage device that includes programs associated with a streaming application, running one or more of the programs, ensuring that a streaming software player is installed, and executing a streaming-related activity associated with the streaming application. An example of a system according to the technique includes a means for providing a streaming application that expects content to be found on a media drive, a means for intercepting requests for content expected to be found on the media drive, and a means for honoring the requests with content from a different media location.

20 Claims, 21 Drawing Sheets

U.S. PATENT DOCUMENTS

| | | |
|---|---|---|
| 5,771,354 A | 6/1998 | Crawford |
| 5,778,395 A | 7/1998 | Whiting et al. |
| 5,790,753 A | 8/1998 | Krishnamoorthy et al. |
| 5,805,809 A | 9/1998 | Singh et al. |
| 5,809,144 A | 9/1998 | Sirbu et al. |
| 5,812,881 A | 9/1998 | Ku et al. |
| 5,818,711 A | 10/1998 | Schwabe et al. |
| 5,822,537 A | 10/1998 | Katseff et al. |
| 5,835,722 A | 11/1998 | Bradshaw et al. |
| 5,838,910 A | 11/1998 | Domenikos et al. |
| 5,855,020 A | 12/1998 | Kirsch |
| 5,874,986 A | 2/1999 | Gibbon et al. |
| 5,878,425 A | 3/1999 | Redpath |
| 5,881,229 A | 3/1999 | Singh et al. |
| 5,881,232 A | 3/1999 | Cheng et al. |
| 5,892,915 A | 4/1999 | Duso et al. |
| 5,892,953 A | 4/1999 | Bhagria et al. |
| 5,895,454 A | 4/1999 | Harrington |
| 5,895,471 A | 4/1999 | King et al. |
| 5,901,315 A | 5/1999 | Edwrads et al. |
| 5,903,721 A | 5/1999 | Sixtus |
| 5,903,732 A | 5/1999 | Reed et al. |
| 5,903,892 A | 5/1999 | Hoffert et al. |
| 5,905,868 A | 5/1999 | Baghai et al. |
| 5,905,990 A | 5/1999 | Linglett |
| 5,909,545 A | 6/1999 | Frese et al. |
| 5,911,043 A | 6/1999 | Duffy et al. |
| 5,918,015 A | 6/1999 | Suzuki et al. |
| 5,923,885 A | 7/1999 | Johnson |
| 5,925,126 A | 7/1999 | Hsieh |
| 5,929,849 A | 7/1999 | Kikinis |
| 5,931,907 A | 8/1999 | Davies et al. |
| 5,933,603 A | 8/1999 | Vahalia et al. |
| 5,933,822 A | 8/1999 | Braden-Harder et al. |
| 5,943,424 A | 8/1999 | Berger et al. |
| 5,948,062 A | 9/1999 | Tzelnic et al. |
| 5,948,065 A | 9/1999 | Eilert et al. |
| 5,949,877 A | 9/1999 | Traw et al. |
| 5,953,506 A | 9/1999 | Kalra et al. |
| 5,956,717 A | 9/1999 | Kraay et al. |
| 5,960,411 A | 9/1999 | Hartman et al. |
| 5,960,439 A | 9/1999 | Hammer et al. |
| 5,961,586 A | 10/1999 | Pedersen |
| 5,961,591 A | 10/1999 | Jones et al. |
| 5,963,444 A | 10/1999 | Shidira et al. |
| 5,963,944 A | 10/1999 | Admas |
| 5,973,696 A | 10/1999 | Arganat et al. |
| 5,987,454 A | 11/1999 | Hobbs |
| 6,003,065 A | 12/1999 | Yan et al. |
| 6,003,095 A | 12/1999 | Pekowski et al. |
| 6,014,686 A | 1/2000 | Elnozahy et al. |
| 6,018,619 A | 1/2000 | Allrad et al. |
| 6,026,166 A | 2/2000 | LeBourgeois |
| 6,028,925 A | 2/2000 | Van Berkum et al. |
| 6,038,379 A | 3/2000 | Fletcher et al. |
| 6,038,610 A | 3/2000 | Belfiore et al. |
| 6,047,323 A | 4/2000 | Krause |
| 6,049,835 A | 4/2000 | Gagnon |
| 6,061,738 A | 5/2000 | Osaku et al. |
| 6,065,043 A | 5/2000 | Domenikos et al. |
| 6,076,104 A | 6/2000 | McCue |
| 6,081,842 A | 6/2000 | Shachar et al. |
| 6,085,186 A | 7/2000 | Christianson et al. |
| 6,085,193 A | 7/2000 | Malkin et al. |
| 6,088,705 A | 7/2000 | Lightstone |
| 6,092,194 A | 7/2000 | Touboul |
| 6,094,649 A | 7/2000 | Bowen et al. |
| 6,099,408 A | 8/2000 | Schneier et al. |
| 6,101,482 A | 8/2000 | DiAngelo et al. |
| 6,101,491 A | 8/2000 | Woods |
| 6,101,537 A | 8/2000 | Edelstein et al. |
| 6,108,420 A | 8/2000 | Larose et al. |
| 6,115,741 A | 9/2000 | Domenikos et al. |
| 6,138,271 A | 10/2000 | Keeley |
| 6,154,878 A | 11/2000 | Saboff |
| 6,157,948 A | 12/2000 | Inoue et al. |
| 6,173,330 B1 | 1/2001 | Guo et al. |
| 6,185,608 B1 | 2/2001 | Hon et al. |
| 6,192,398 B1 | 2/2001 | Hunt et al. |
| 6,192,408 B1 | 2/2001 | Vahalia et al. |
| 6,195,694 B1 | 2/2001 | Chen et al. |
| 6,212,640 B1 | 4/2001 | Abdelnur et al. |
| 6,219,693 B1 | 4/2001 | Napolitano et al. |
| 6,226,665 B1 | 5/2001 | Deo et al. |
| 6,253,234 B1 | 6/2001 | Hunt et al. |
| 6,275,470 B1 | 8/2001 | Ricciulli |
| 6,275,496 B1 | 8/2001 | Burns et al. |
| 6,278,992 B1 | 8/2001 | Curtis et al. |
| 6,282,712 B1 | 8/2001 | Davis et al. |
| 6,298,356 B1 | 10/2001 | Jawahar et al. |
| 6,301,605 B1 | 10/2001 | Napolitano et al. |
| 6,311,221 B1 | 10/2001 | Raz et al. |
| 6,330,561 B1 | 12/2001 | Cohen et al. |
| 6,343,287 B1 | 1/2002 | Kumar et al. |
| 6,347,398 B1 | 2/2002 | Parthasarathy et al. |
| 6,356,946 B1 | 3/2002 | Clegg et al. |
| 6,370,686 B1 | 4/2002 | Delo et al. |
| 6,374,402 B1 | 4/2002 | Schmeidler et al. |
| 6,385,596 B1 | 5/2002 | Wiser et al. |
| 6,389,467 B1 | 5/2002 | Eyal |
| 6,418,554 B1 | 7/2002 | Delo et al. |
| 6,418,555 B2 | 7/2002 | Mohammed |
| 6,418,556 B1 | 7/2002 | Bennington et al. |
| 6,424,991 B1 | 7/2002 | Gish |
| 6,425,017 B1 | 7/2002 | Dievendorff et al. |
| 6,449,688 B1 | 9/2002 | Peters et al. |
| 6,453,334 B1 | 9/2002 | Vinson et al. |
| 6,457,076 B1 | 9/2002 | Cheng et al. |
| 6,508,709 B1 | 1/2003 | Karmarkar |
| 6,510,458 B1 | 1/2003 | Berstis et al. |
| 6,510,462 B2 | 1/2003 | Blumenau |
| 6,510,466 B1 | 1/2003 | Cox et al. |
| 6,574,618 B2 | 6/2003 | Eylon et al. |
| 6,584,507 B1 | 6/2003 | Bradley et al. |
| 6,587,857 B1 | 7/2003 | Carothers et al. |
| 6,594,682 B2 | 7/2003 | Peterson et al. |
| 6,598,125 B2 | 7/2003 | Romm |
| 6,601,103 B1 | 7/2003 | Goldschmidt Iki et al. |
| 6,601,110 B2 | 7/2003 | Marsland |
| 6,605,956 B2 | 8/2003 | Farnworth et al. |
| 6,609,114 B1 | 8/2003 | Gressel et al. |
| 6,611,812 B2 | 8/2003 | Hurtado et al. |
| 6,622,137 B1 | 9/2003 | Ravid et al. |
| 6,622,171 B2 | 9/2003 | Gupta et al. |
| 6,636,961 B1 | 10/2003 | Braun et al. |
| 6,687,745 B1 | 2/2004 | Franco et al. |
| 6,694,510 B1 | 2/2004 | Williems |
| 6,697,869 B1 | 2/2004 | Mallart et al. |
| 6,711,619 B1 | 3/2004 | Chanderamohan et al. |
| 6,732,179 B1 | 5/2004 | Brown et al. |
| 6,735,631 B1 | 5/2004 | Oekrke et al. |
| 6,757,708 B1 | 6/2004 | Craig et al. |
| 6,757,894 B2 | 6/2004 | Eylon et al. |
| 6,763,370 B1 | 7/2004 | Schmeidler et al. |
| 6,772,209 B1 | 8/2004 | Chernock et al. |
| 6,775,779 B1 | 8/2004 | England et al. |
| 6,779,179 B1 | 8/2004 | Romm et al. |
| 6,785,768 B2 | 8/2004 | Peters et al. |
| 6,785,865 B1 | 8/2004 | Cote et al. |
| 6,801,507 B1 | 10/2004 | Humpleman et al. |
| 6,810,525 B1 | 10/2004 | Safadi et al. |
| 6,816,909 B1 | 11/2004 | Chang et al. |
| 6,816,950 B2 | 11/2004 | Nichols |
| 6,832,222 B1 | 12/2004 | Zimowski |
| 6,836,794 B1 | 12/2004 | Lucowsky et al. |
| 6,854,009 B1 | 2/2005 | Hughes |
| 6,891,740 B2 | 5/2005 | Williams |
| 6,918,113 B2 | 7/2005 | Patel et al. |
| 6,925,495 B2 | 8/2005 | Hedge et al. |
| 6,938,096 B1 | 8/2005 | Greschler et al. |
| 6,959,320 B2 | 10/2005 | Shah et al. |
| 6,970,866 B1 | 11/2005 | Pravetz et al. |
| 7,028,305 B2 | 4/2006 | Schaefer et al. |
| 7,043,524 B2 | 5/2006 | Shah et al. |
| 7,051,315 B2 | 5/2006 | Artzi et al. |
| 7,062,567 B2 | 6/2006 | Benitez et al. |
| 7,096,253 B2 | 8/2006 | Vinson et al. |

| | | |
|---|---|---|
| 7,112,138 B2 | 9/2006 | Hendrick et al. |
| 7,130,616 B2 * | 10/2006 | Janik .......................... 455/412.1 |
| 7,191,441 B2 | 3/2007 | Abbott et al. |
| 7,192,352 B2 | 3/2007 | Walker et al. |
| 7,197,516 B1 | 3/2007 | Hipp et al. |
| 2001/0003828 A1 | 6/2001 | Peterson et al. |
| 2001/0014878 A1 | 8/2001 | Mitra et al. |
| 2001/0034736 A1 | 10/2001 | Eylon et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2001/0044851 A1 | 11/2001 | Rothman et al. |
| 2002/0015106 A1 | 2/2002 | Taylor, Jr. |
| 2002/0019864 A1 | 2/2002 | Mayer |
| 2002/0042833 A1 | 4/2002 | Hendler et al. |
| 2002/0047899 A1 | 4/2002 | Son et al. |
| 2002/0057893 A1 | 5/2002 | Wood et al. |
| 2002/0059402 A1 | 5/2002 | Belanger |
| 2002/0065848 A1 | 5/2002 | Walker et al. |
| 2002/0078170 A1 | 6/2002 | Brewer et al. |
| 2002/0078203 A1 | 6/2002 | Greschler et al. |
| 2002/0083183 A1 | 6/2002 | Pujare et al. |
| 2002/0083187 A1 | 6/2002 | Sim et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0133491 A1 | 9/2002 | Sim et al. |
| 2002/0138640 A1 | 9/2002 | Raz et al. |
| 2002/0156911 A1 | 10/2002 | Croman et al. |
| 2003/0004882 A1 | 1/2003 | Holler et al. |
| 2003/0009538 A1 | 1/2003 | Shah et al. |
| 2003/0056112 A1 | 3/2003 | Vinson et al. |
| 2003/0105816 A1 | 6/2003 | Goswami |
| 2003/0140160 A1 | 7/2003 | Raz et al. |
| 2004/0036722 A1 | 2/2004 | Warren |
| 2004/0128342 A1 | 7/2004 | Maes et al. |
| 2004/0133657 A1 | 7/2004 | Smith et al. |
| 2004/0199566 A1 | 10/2004 | Carlson et al. |
| 2004/0230784 A1 | 11/2004 | Cohen |
| 2004/0230971 A1 | 11/2004 | Rachman et al. |
| 2004/0267813 A1 | 12/2004 | Rivers-Moore et al. |
| 2004/0268361 A1 | 12/2004 | Schaefer |
| 2005/0010607 A1 | 1/2005 | Parker et al. |
| 2005/0010670 A1 | 1/2005 | Greschler et al. |
| 2005/0091534 A1 | 4/2005 | Nave et al. |
| 2005/0114472 A1 | 5/2005 | Tan |
| 2005/0193139 A1 | 9/2005 | Vinson et al. |
| 2006/0010074 A1 | 1/2006 | Zeitsiff et al. |
| 2006/0031165 A1 | 2/2006 | Nave et al. |
| 2006/0047716 A1 | 3/2006 | Keith, Jr. |
| 2006/0048136 A1 | 3/2006 | De Vries et al. |
| 2006/0106770 A1 | 5/2006 | De Vries et al. |
| 2006/0123185 A1 | 6/2006 | De Vries et al. |
| 2006/0136389 A1 | 6/2006 | Cover et al. |
| 2007/0038642 A1 | 2/2007 | Durgin et al. |
| 2007/0043550 A1 | 2/2007 | Tzruya |
| 2007/0067435 A1 | 3/2007 | Landis et al. |
| 2007/0074223 A1 | 3/2007 | Lescouet et al. |
| 2007/0126749 A1 | 6/2007 | Tzruya et al. |
| 2007/0129146 A1 | 6/2007 | Tzruya et al. |
| 2007/0129990 A1 | 6/2007 | Tzruya et al. |
| 2007/0130292 A1 | 6/2007 | Tzruya et al. |
| 2007/0168309 A1 | 7/2007 | Tzruya et al. |
| 2007/0196074 A1 * | 8/2007 | Jennings et al. ................ 386/46 |

FOREIGN PATENT DOCUMENTS

| | | |
|---|---|---|
| EP | 1 020 824 A2 | 7/2000 |
| EP | 1 143 349 | 10/2001 |
| TW | 200644550 | 12/2006 |
| WO | WO 98/40993 A1 | 9/1998 |
| WO | WO 98/50853 A1 | 11/1998 |
| WO | WO 99/57863 A1 | 11/1999 |
| WO | WO 99/60458 A2 | 11/1999 |
| WO | WO 00/04681 | 1/2000 |
| WO | WO 00/31657 | 6/2000 |
| WO | WO 00/31672 A2 | 6/2000 |
| WO | WO 00/56028 A1 | 9/2000 |
| WO | WO 01/27805 A2 | 4/2001 |
| WO | WO 01/46856 A1 | 6/2001 |
| WO | WO 02/44840 A2 | 6/2002 |
| WO | WO 2006/022745 A2 | 3/2006 |
| WO | WO 2006/047133 A2 | 5/2006 |
| WO | WO 2006/055445 A2 | 5/2006 |
| WO | WO 2006/102532 A2 | 9/2006 |
| WO | WO 2006/102621 A2 | 9/2006 |

OTHER PUBLICATIONS

Chu, et al, Referee: Trust Management for Web Applications, Proceedings of the Sixth International World Wide Web Conference, 1997, retrieved online on Jun. 15, 2006 at http://www.si.umich.edu/~presnick/papers/Referee/www6-referee.html.

Faupel, Status of Industry Work on Signed Mobile Code, Joint European Networking Conference (JENC), May 1997, 313-1-313-8.

Fiedler et al, UNIX System V, Release 4 Administration, Second Edition, 1991, 1-13, 37-116, 152-153, 175-200, 291-312, Hayden Books, Carmel, Indiana, USA.

Mullender et al, Amoeba: A Distributed Operating System for the 1990s, Computer Magazine, May 1990, 44-53, 23(5).

Nakayoshi et al, A Secure Private File System with Minimal System Administration, Communications, Computers and Signal Processing, 1997 IEEE Pacific Rim Conference, 251-255, vol. 1.

O'Mahony, Donal, Security Considerations in a Network Management Environment, 1994, 12-17, vol. 8, IEEE, USA.

Pyarali et al, Design and Performance of an Object-Oriented Framework for High-Speed Electronic Medical Imaging, Fall 1996, Computing Systems Journal, 331-375, vol. 9 No. 4, USENIX, retrieved online on Jun. 15, 2006 at http://www.cs.wustl.edu/~schmidt/PDF/COOTS-96.pdf.

Reinhardt, Robert B., An Architectural Overview of UNIX Network Security, ARINC Research Corporation, Sep. 19, 1992, retrieved online on Jun. 15, 2006 at http://www.clusit.it/whitepapers/unixnet.pdf.

Tardo & Valente, Mobile Agent Security and Telescript, 4$^{th}$ International Conference of the IEEE Computer Society (IEEE CompCon1996), Feb. 1996.

U.S. Appl. No. 10/023,915, filed Dec. 14, 2001, De Vries et al.
U.S. Appl. No. 11/274,442, filed Nov. 14, 2005, De Vries et al.
U.S. Appl. No. 11/371,627, filed Mar. 8, 2006, De Vries et al.
U.S. Appl. No. 11/388,381, filed Mar. 23, 2006, De Vries et al.
U.S. Appl. No. 11/371,627, filed May 8, 2006, De Vries et al.
U.S. Appl. No. 11/388,381, filed May 23, 2006, De Vries et al.

Boneh et al, An Attack on RSA Given a Small Fraction of the Private Key Bits, Advances in Cryptology—ASIACRYPT '98, Lecture Notes in Computer Science, 25-34, V.1514, Springer-Verlag Berlin Heidelberg, retrieved online on Jun. 15, 2006 at http://crypto.stanford.edu/~dabo/abstracts/bits_of_d.html.

Binto, George et al, Secure Transaction Processing in Firm Real-Time Database Systems, SIGMOD International Conference on Management of Data 1997, 462-473, V26, Issue 2, Association for Computing Machinery (ACM) Press, Tucson, Arizona, United States.

Pyarali et al, Design and Performance of an Object-Oriented Framework for High-Speed Electronic Medical Imaging, Fall 1996, Computing Systems Journal 331-375, vol. 9 No. 4, USENIX, retrieved online on Jun. 15, 2006 at http://www.cs.wustl.edu/~schmidt/PDF/COOTS-96.pdf.

International Application No. PCT/US2005/041024, Written Opinion and International Search Report mailed Feb. 27, 2007.

Avi Rappaport, "Robots & Spiders & Crawlers: How Web and Intranet Search Engines Follow Links to Build Indexes", Infoseek Software, pp. 1-38 (Oct. 1999).

Gralla, Preston, Chapter 44, "Shopping on the Internet" How the Internet Works, IEEE Personal Communications, Aug. 1999, 260-67, QUE—A divison of Macmillon Computer Publishing, Millenium Edition.

Marvin Sirbu et al., "Netbill: An Internet Commerce System Optimized for Network-Delivered Services", *IEEE Personal Communications*, 2(4):34-39 (Aug. 1995).

Microsoft Corp., Computer Dictionary, 3$^{rd}$ edition, 1997, 119 & 305, Microsoft Press.

Morrow, Brian et al., Indexing Within—The Lost Gold Within the Enetrprise: Endeavors Technology, Aug. 22, 2000, pp. 1-6.

Peter Bailey, et al., "Chart of Darkness: Mapping a Large Intranet", Dept of Computer Science, FEIT, The Australian National University, Canberra ACT 0200, Australia pp. 1-23, http://pastime.anu.edu.au/nick/pubs/www9/cod.html. (Feb. 2001).

Sergey Brin, et al., "The Anatomy of a Large-Scale Hypertextual Web Search Engine", Computer Science Department, Stanford University, Stanford, CA 94305 pp. 1-20.

\* cited by examiner

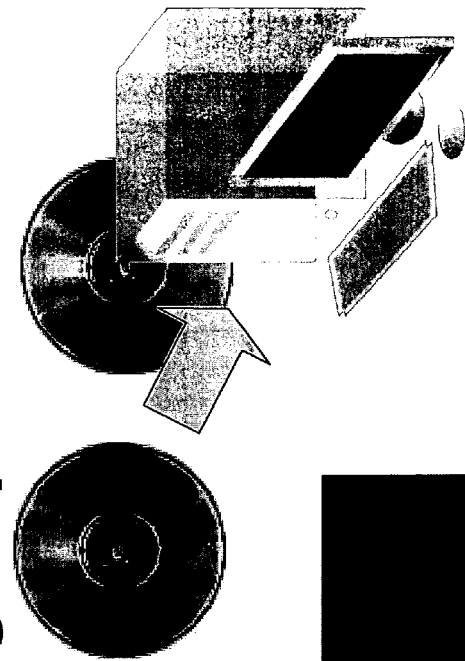
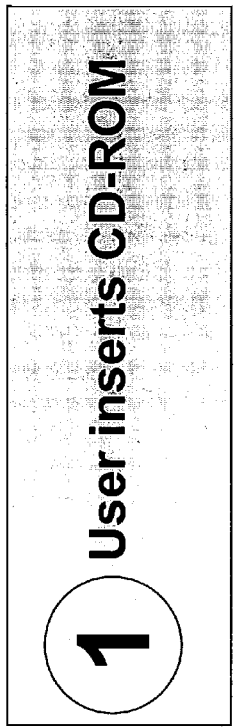
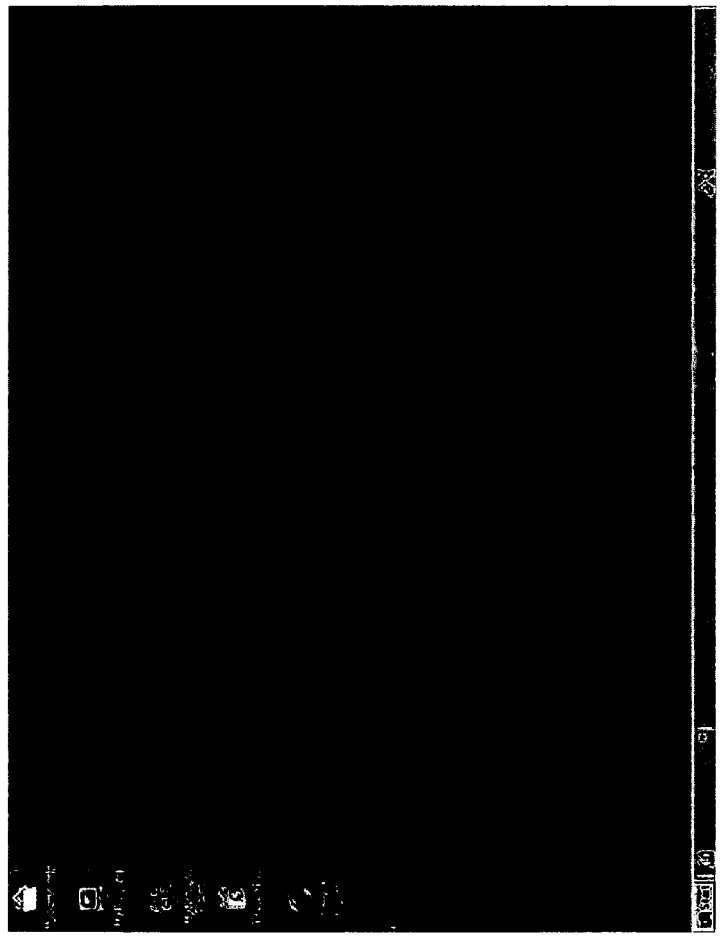
FIG. 2A

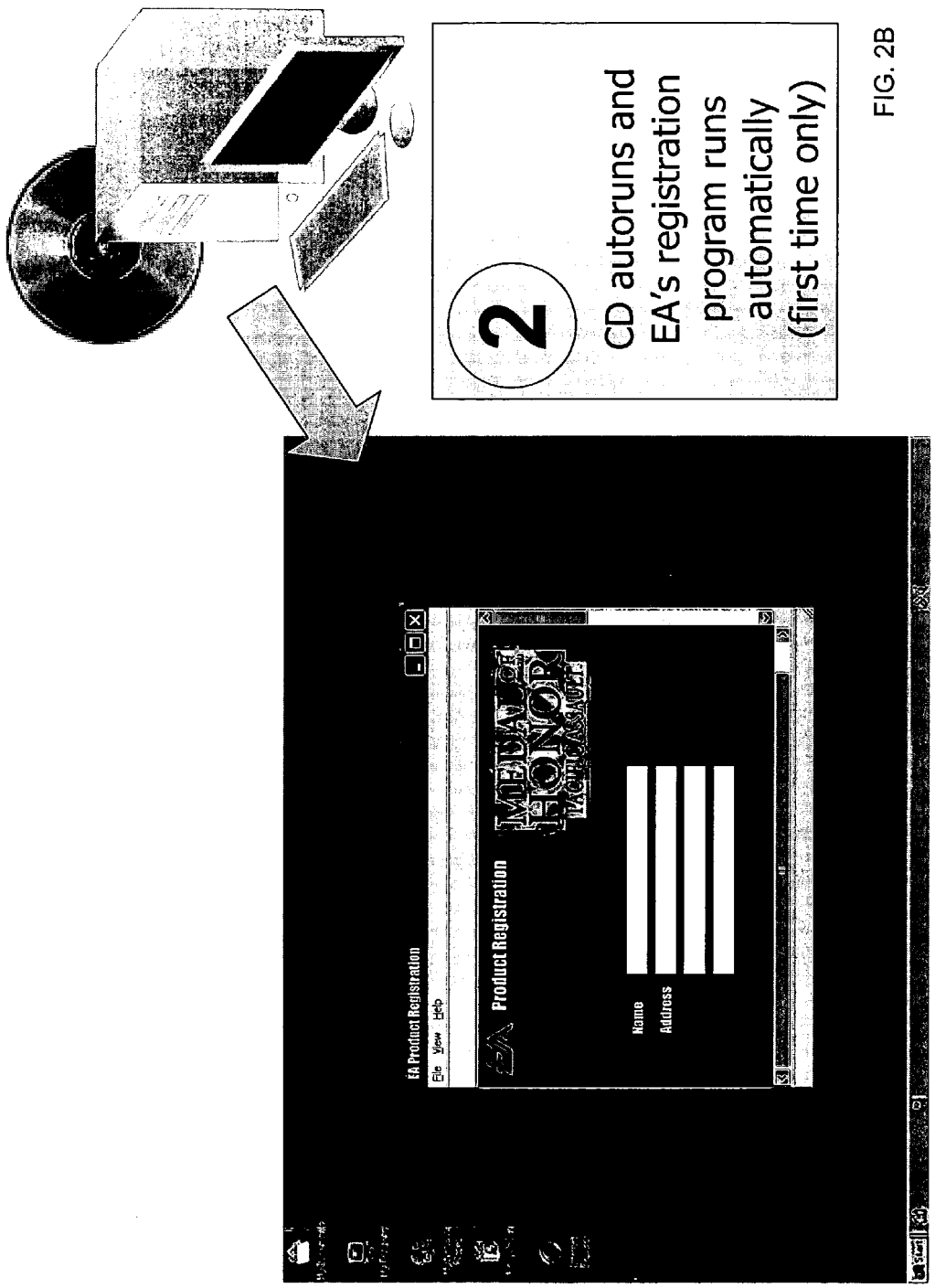

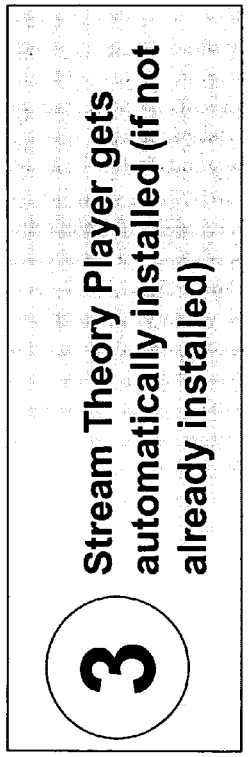
FIG. 2C

The CD Streaming Experience
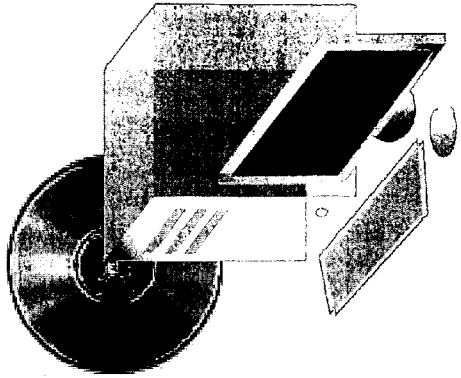
④ Splash Screen is Shown
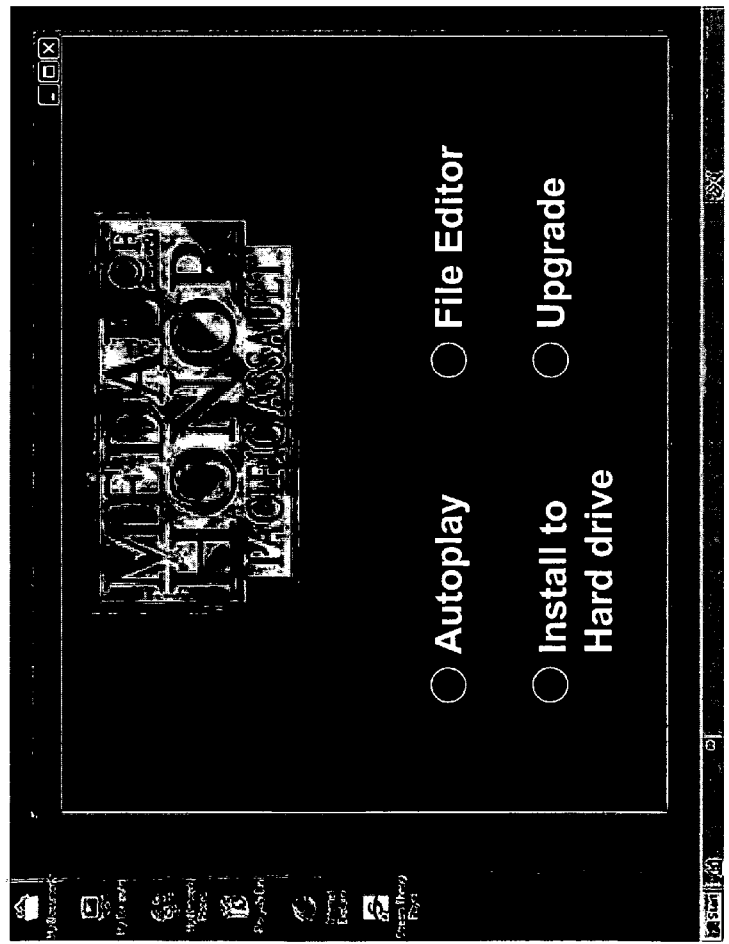
FIG. 2D

The CD Streaming Experience
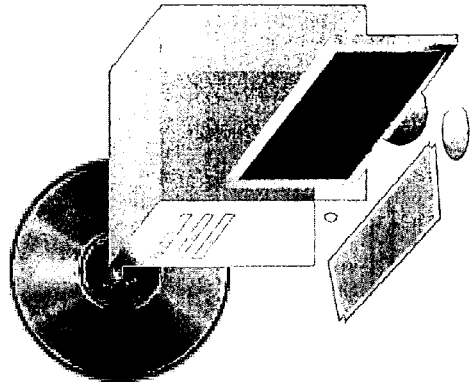
Click on "Autoplay"
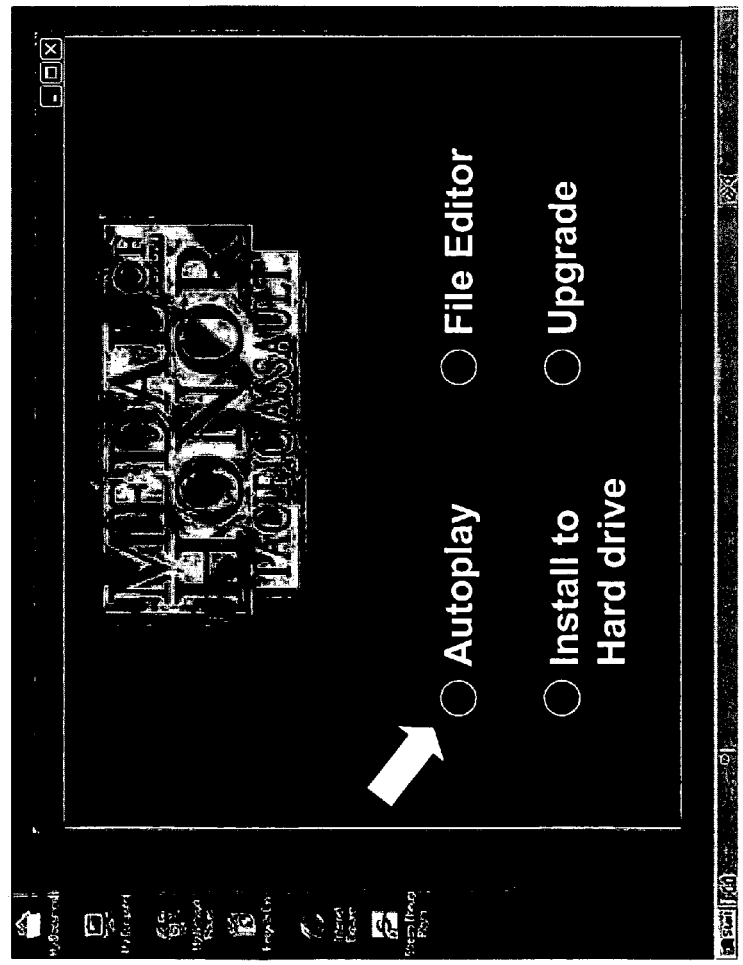
FIG. 2E

The CD Streaming Experience
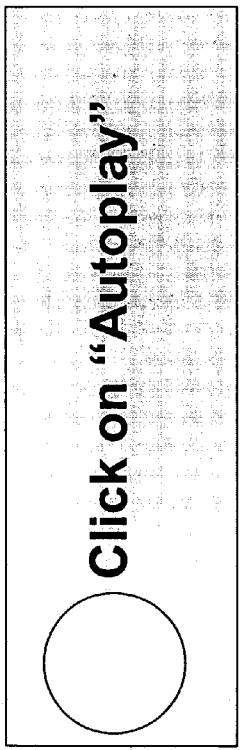
Click on "Autoplay"
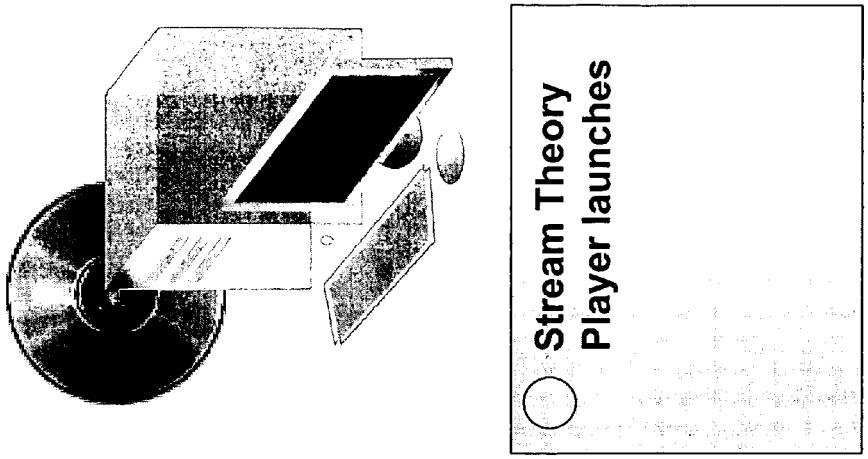
Stream Theory Player launches
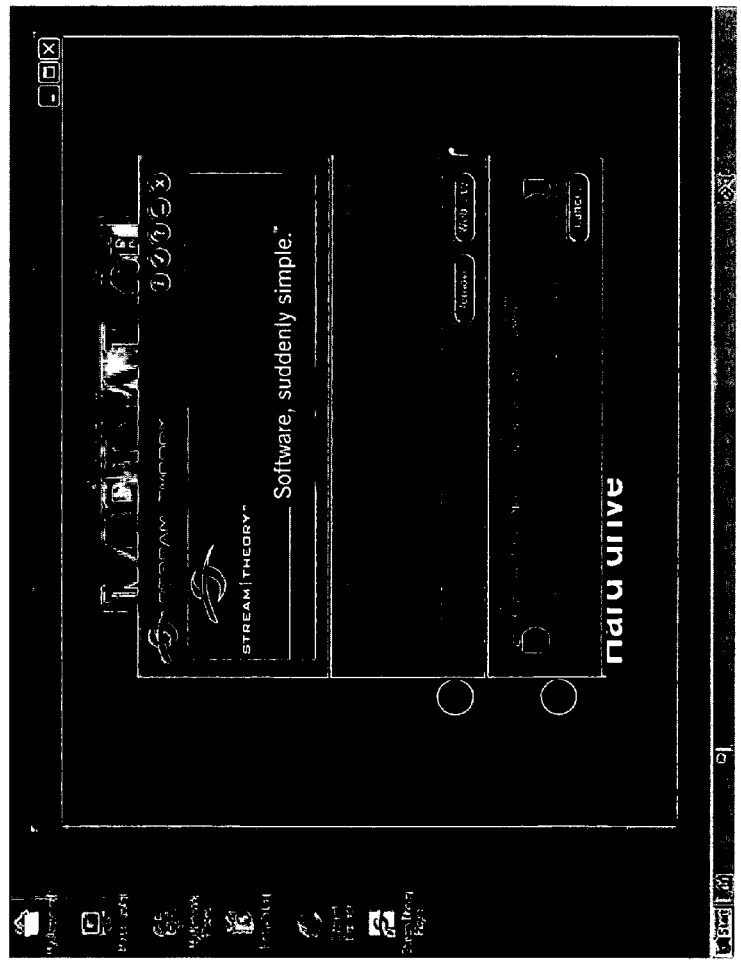
FIG. 2F

The CD Streaming Experience
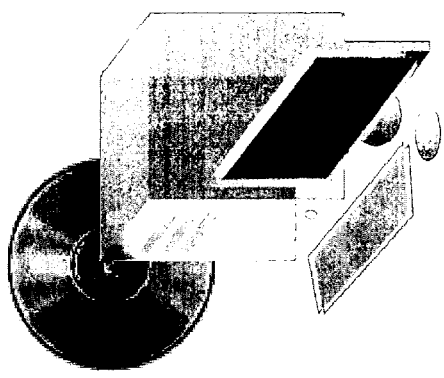
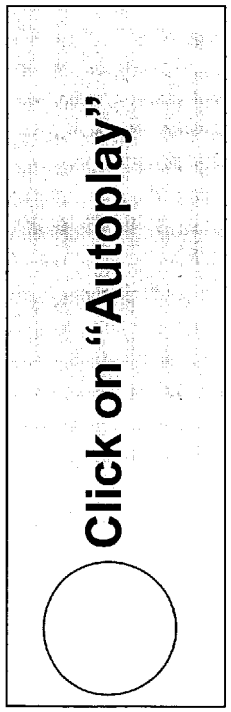
○ Click on "Autoplay"
○ Game streams from CD
○ Game plays using data from CD and "normal" Player cache
FIG. 2G

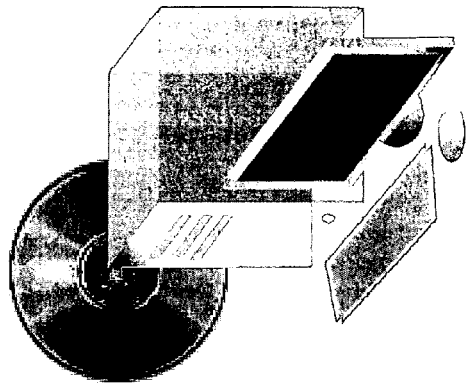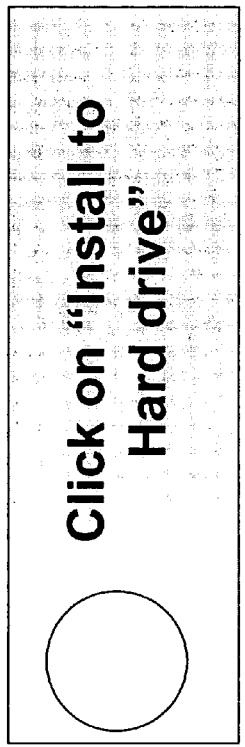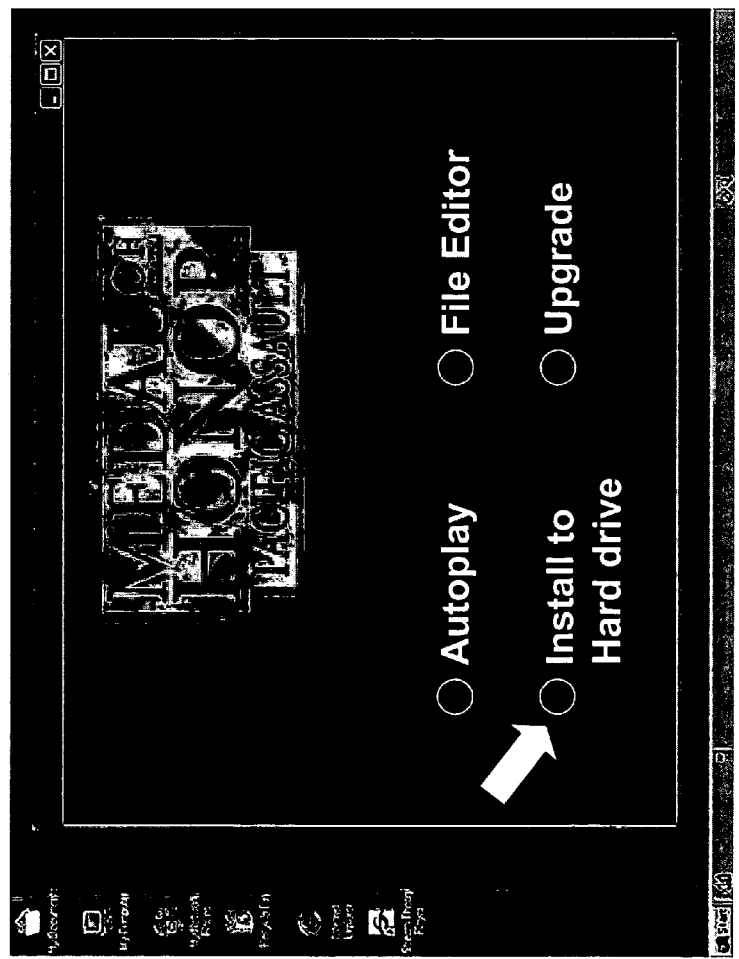
FIG. 2H

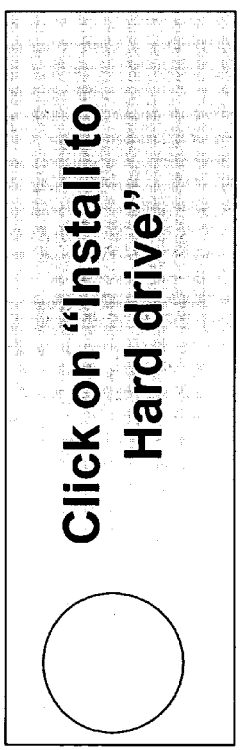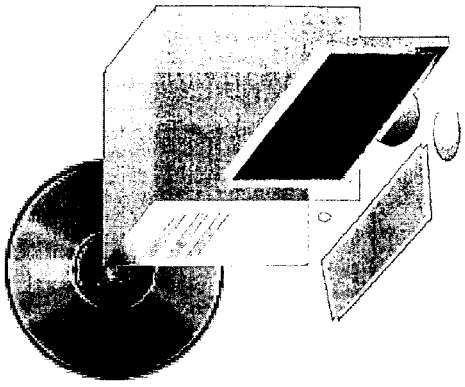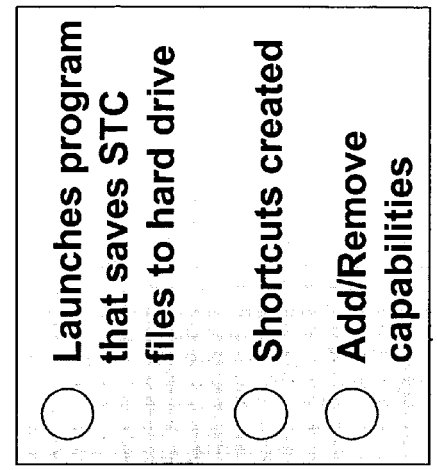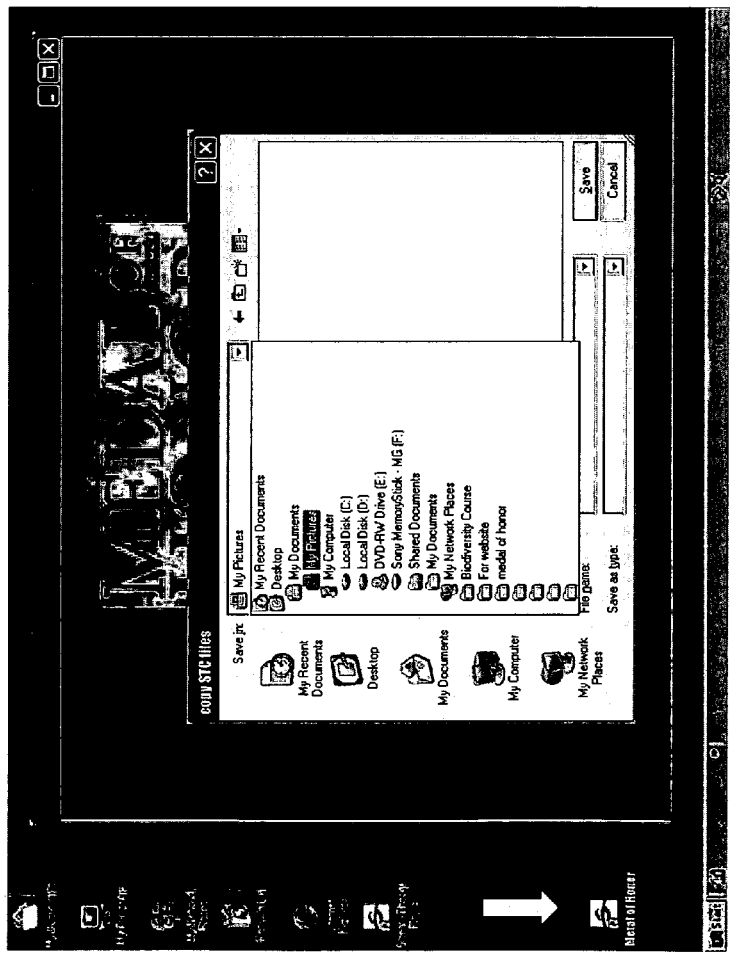
FIG. 21

The CD Streaming Experience
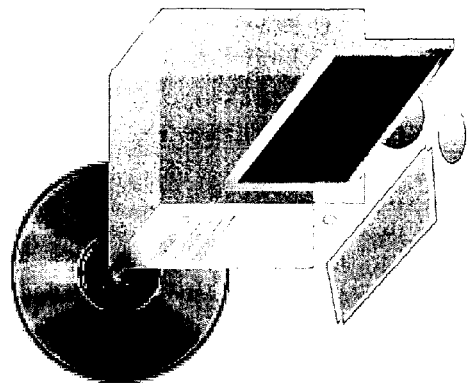
- Click on "Install to Hard drive"
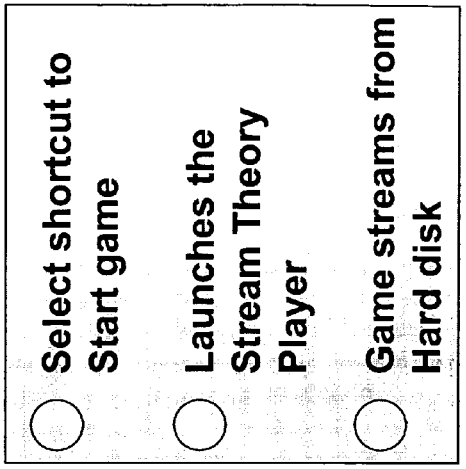
- Select shortcut to Start game
- Launches the Stream Theory Player
- Game streams from Hard disk
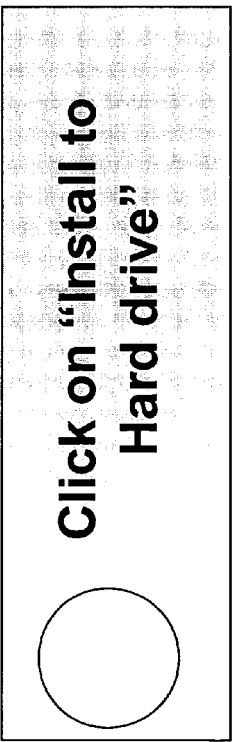
FIG. 2J

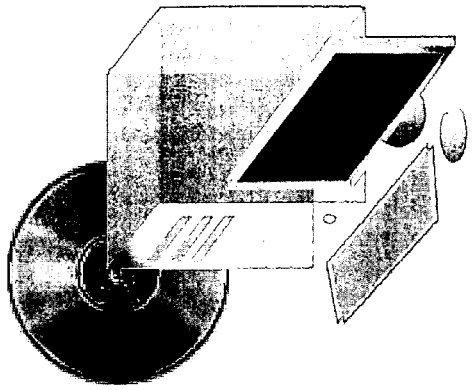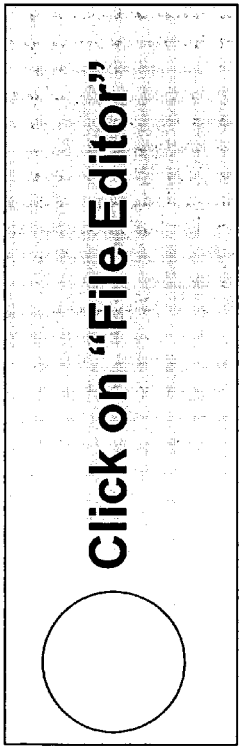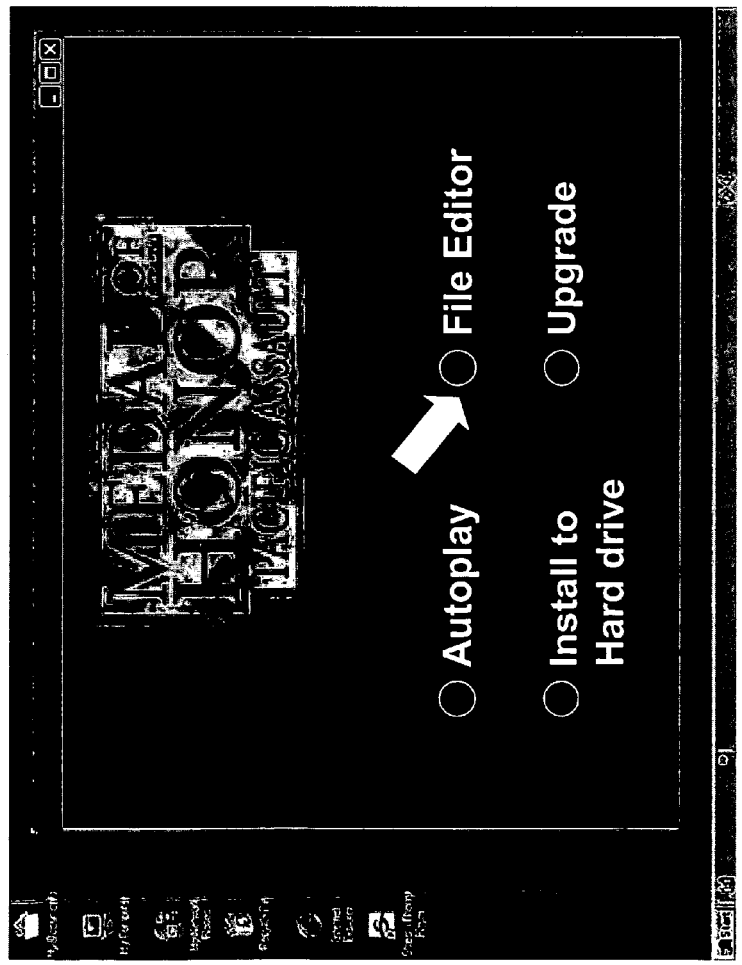
FIG. 2K

The CD Streaming Experience
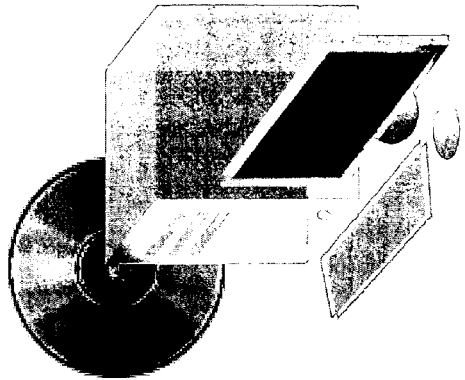
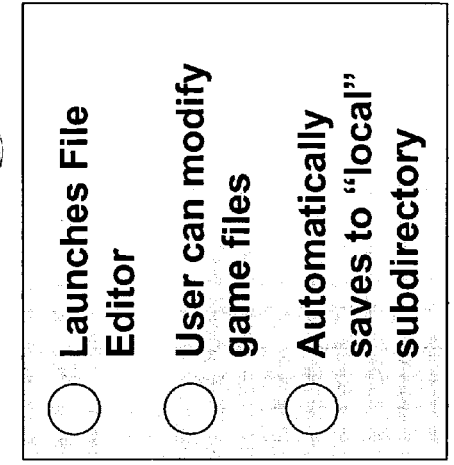
- Launches File Editor
- User can modify game files
- Automatically saves to "local" subdirectory
Click on "Install to File Editor"
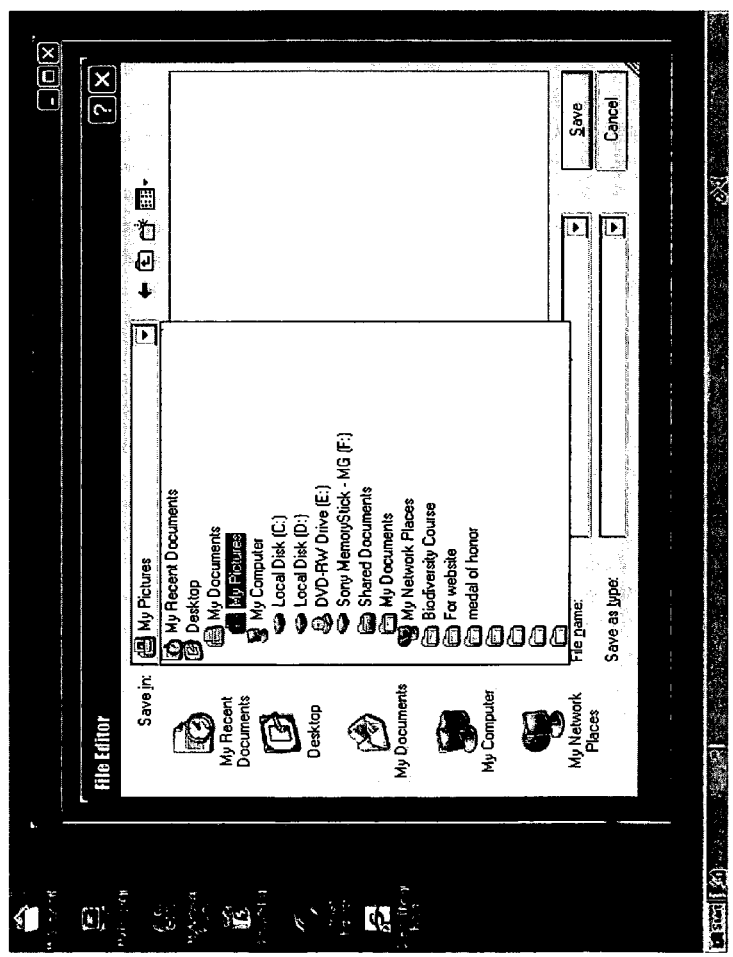
FIG. 2L

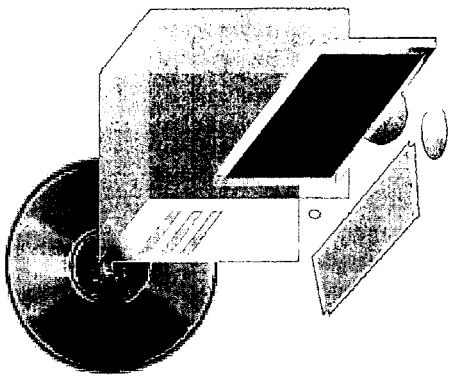
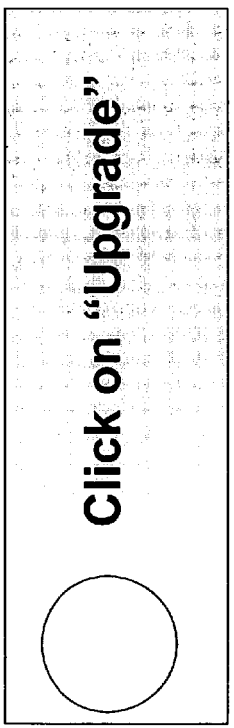
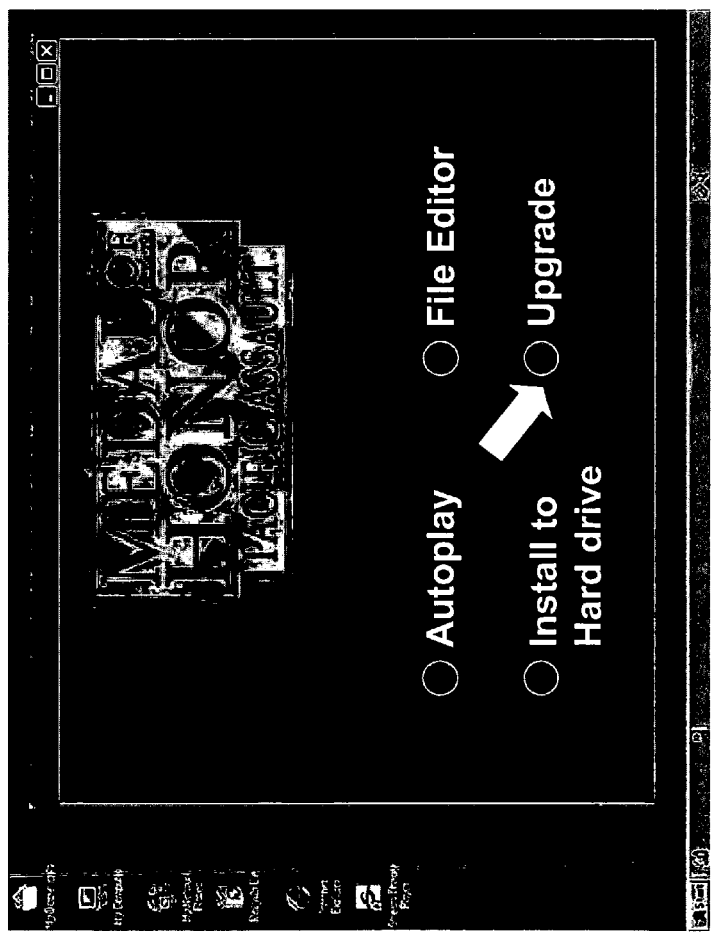
FIG. 2M

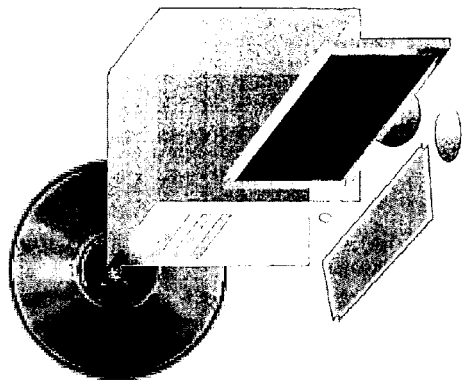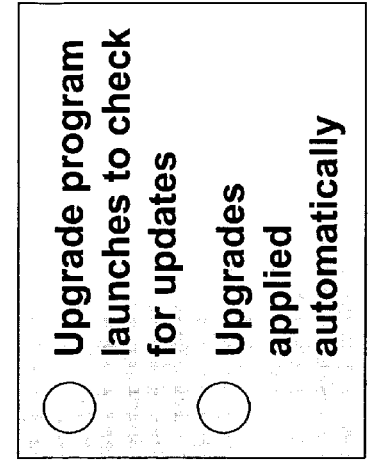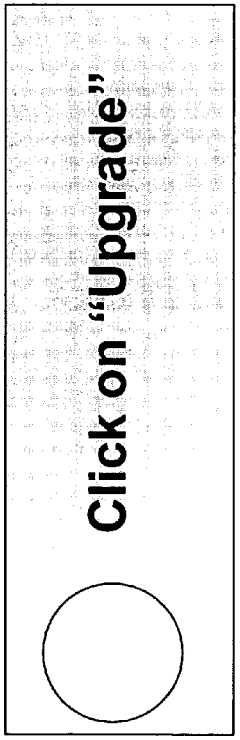
FIG. 2N

STREAMING FROM A MEDIA DEVICE

CROSS REFERENCE TO RELATED APPLICATIONS

This application claims priority to U.S. Provisional Application 60/627,502 filed Nov. 13, 2004, U.S. Provisional Application 60/628,517 filed Nov. 15, 2004, and co-pending U.S. Utility application Ser. No. 11/274,442, filed Nov. 14, 2005, all of which are hereby incorporated by reference in their entirety.

BACKGROUND

Software streaming involves downloading small pieces of files as the pieces are needed by the program being streamed. These small pieces may be referred to as blocks. A streaming client sends requests for blocks as they are needed up to a streaming server, which sends back streaming data that is associated with the requested block. Sending a request and receiving the streaming data may cause delays that can slow down the streamed program.

There are many problems associated with streaming software that it would be advantageous to negate, work around, or reduce. For example, speeding up execution of streaming programs is an on-going issue. As another example, streaming to devices that occasionally lose a connection has not been satisfactorily addressed. As another example, it may be desirable to provide a user with an experience similar to that associated with an installed, as opposed to streamed, program. As another example, it may be desirable to provide streamed programs on consoles.

SUMMARY

A technique for streaming from a media device involves enabling a local device to function as a streaming server. An example of a method according to the technique includes inserting a removable storage device that includes programs associated with a streaming application; running one or more of the programs; ensuring that a streaming software player is installed; and executing a streaming-related activity associated with the streaming application. The method may further include accessing data from the removable storage device necessary to stream a software application using the streaming software player. In a non-limiting embodiment, the method may also include checking for updates to a streaming application. To facilitate editing files according to a non-limiting embodiment, the method may further include launching a file editor associated with a streaming application. The streaming software player may, for example, use the modified files instead of original files when streaming the streaming application. In a non-limiting embodiment, the method may further include intercepting requests for content expected to be found on the media drive and honoring the requests with content from a different media location.

Another example of a method according to the technique includes reading a streaming application from a removable storage device; installing the streaming application on a hard drive; launching a streaming software player; and streaming the streaming application from the hard drive.

An example of a system according to the technique includes a means for providing a streaming application that expects content to be found on a media drive; a means for intercepting requests for content expected to be found on the media drive; and a means for honoring the requests with content from a different media location.

BRIEF DESCRIPTION OF THE DRAWINGS

Embodiments of the invention are illustrated in the figures. However, the embodiments and figures are illustrative rather than limiting; they provide examples of the invention.

FIGS. 2A to 2N are intended to illustrate an example of a streaming software experience.

DETAILED DESCRIPTION

Figure 1:
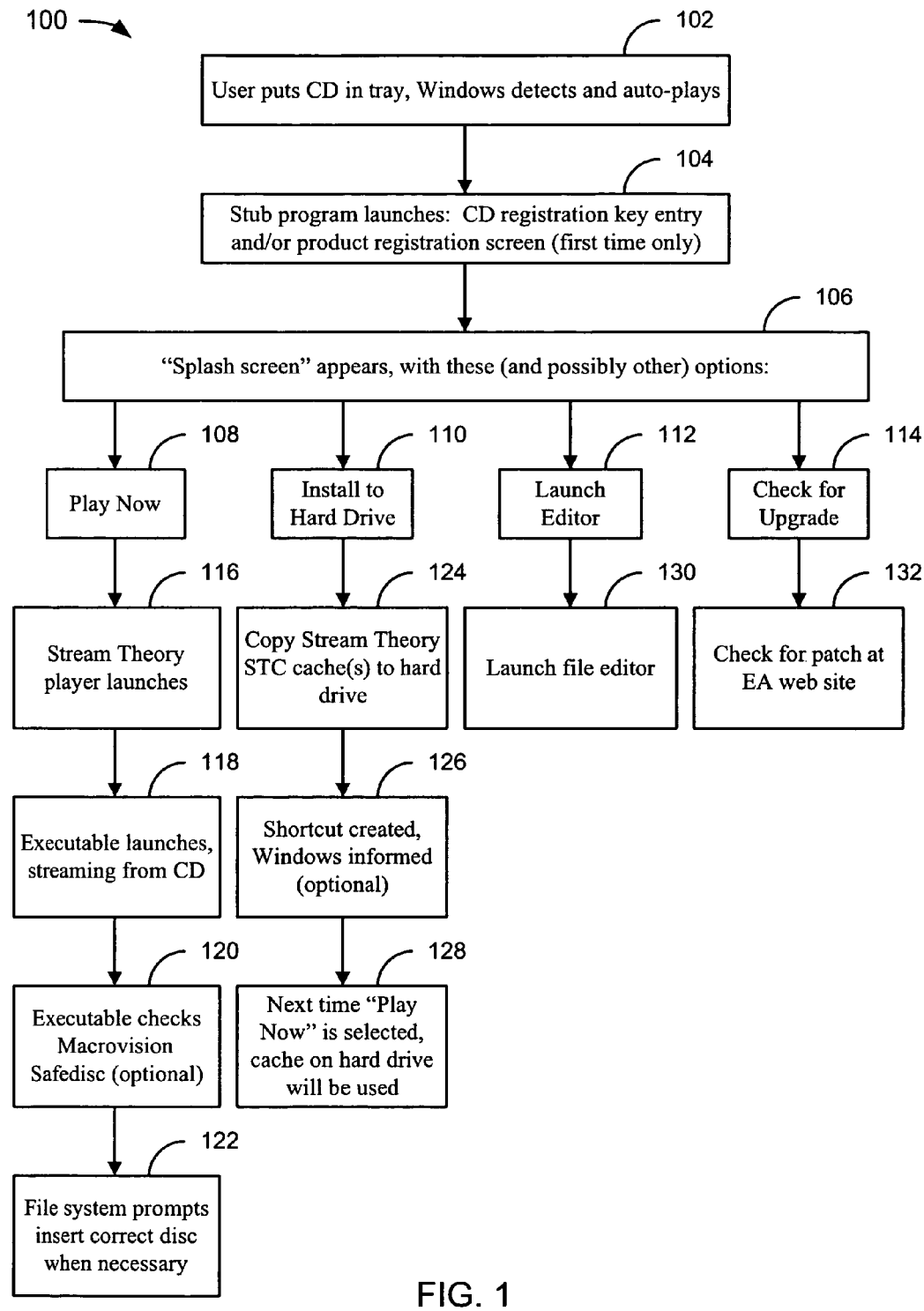
FIG. 1 depicts a flowchart of a process for streaming a software title and other activities associated with the software title.

A technique for a "streaming install" of a software title involves reducing many of the steps typically required to run the software, such as installation of the software and configuration of the environment. A goal when streaming a title is providing a user experience after startup that closely resembles that of an installed software title.

An advantage of an aspect of the technique is that users can experience faster and easier startup than is typical for installation of non-streaming software titles. Another advantage is that PC games, for example, can be made as quick and easy to play as console games. A measure of performance in a streaming application is whether the streamed application performs virtually the same as the same title installed traditionally (i.e., not streamed). In some cases, streamed titles have even performed better than traditionally installed titles.

Some users believe that installation on a hard disk can improve streaming software title performance. This may be true since a CD or DVD may spin down at certain points and incur the delay of spinning up again. Accordingly, in an embodiment, streaming applications are installed on a hard disk. It should be noted that installation of a streaming application on a hard disk is not the same as installation of a non-streaming application; the streaming application is still streamed after installation, it is just streamed from the hard disk instead of, for example, a CD or DVD.

Since it may be desirable to support streaming from multiple disks, a full installation can be used to reduce the problem of having to swap disks. In some cases, it may be desirable to require that a single CD or DVD be available as a key, such as a Macrovision SafeDisc key. This may be valuable as a piracy-prevention measure.

Similarly, streamed applications may support applications utilizing Macrovision SafeDisc for security. For example, a CD key may be verified at startup an periodically through the use of the software title using Macrovision SDK features. The Macrovision SafeDisc key may be on each CD.

Some users may wish to modify ("mod") a software title, which requires access to assets and files associated with the software title. Accordingly, users may be provided with access to source assets provided with the software title, such as art assets (models, textures, sounds, level files, etc.) These can be opened modified, copied, or inserted locally. Similarly, users may be able to download a mod from a network and integrate the mod into the software title.

Users and software title providers typically also find software patches desirable. A streamed application may provide a method for users to download the latest patches.

As is common for most software titles in the industry, product registration may be desired when providing CD or DVD streaming titles.

Compression techniques may be applied to fully utilize media on which streamed data files are provided. For example, packaging of data into streaming buffers may be as compact as Zip-style compression.

FIG. 1 depicts a flowchart of a typical process for streaming a software title, and other activities associated with the software title. In a non-limiting embodiment, at module 102 a user puts a CD into a computer, as illustrated in FIG. 2A. In a non-limiting embodiment, upon putting the CD into the computer, an "Autorun.inf" file is processed by the operating system (e.g., Windows 2000) of the computer. The Autorun.inf file references and starts a "Stub" program. At module 104, the Stub program provides initial options to the user.

The Stub program may provide features, such as product registration, streaming player (e.g., Stream Weaver) detection, streaming player installation, providing the user with various menu options, etc. Product registration may involve determining whether a CD registration key has been entered by checking persistent memory on the user's computer. In an embodiment, if the product has not been registered (typically, this is true the first time a title is streamed), then a registration program prompts the user for the relevant registration information, as illustrated in FIG. 2B.

In an embodiment, the Stub program may provide a screen for entering the CD registration key and product registration. The Stub program may save information about the CD registration key and product registration in persistent memory. Registration information may be sent to a vendor or producer of the software title over a network (e.g., the Internet). If no network connection is available, registration may be handled in some other manner, as is well-understood in the art of software registration.

If the user skips the registration process, this fact may be saved in persistent memory, and used when deciding whether to ask the user to register again later. If the registration has been previously declined, then this fact may be saved in persistent memory and a check for whether a predetermined time period has passed is made. If the time period has passed, then the user is given the chance to register again.

In another embodiment, if a CD has been previously registered, the Stub program skips registration and goes directly to a splash screen, as described later with reference to FIG. 2D.

As previously indicated, the Stub program may provide features such as streaming player detection and streaming player installation, as illustrated in FIG. 2C. These features may involve checking for the installation and, if installed, the version of a streaming player by checking the registry for a relevant key value. For example, the registry may include the key value "HKEY_LOCAL_MACHINE\ SOFTWARE\Stream Theory\Stream Theory Player\InstallPath". If the key is present, that should mean the Stream Theory Player is installed and identify the location of the installation. The version of the installed player may be determined by checking the version of the file specified in the key, typically being "C:\Program Files\Stream Theory\stfsd.sys" with a key value of 4.0.0.20. If the player is found, then the version of the player should be compared against the minimum player required. If no player is installed, or if the version is insufficient to support a desired software title, the player, which may be available for install from the CD on with the title is provided, or from a remote location, such as a web site. Installation of the new player may require a reboot.

In a non-limiting embodiment, at module 106 (FIG. 1), the Stub program may also provide the user with various options on a "splash screen," such as is illustrated in FIG. 2D. The options may include an autoplay option 108 (FIG. 1), an install-to-hard-drive option 110 (FIG. 1), a file-editor option 112 (FIG. 1), and an upgrade option 114 (FIG. 1). Additional options (not shown) may include an option to visit a web site, such as the web site of the vendor or producer of the software title, or to quit.

If the user clicks on the autoplay option, as illustrated in FIG. 2E, at module 116 (FIG. 1) the user is given the opportunity to begin receiving the streaming application right away. For example, the game shell may launch, as illustrated in FIG. 2F, presenting user with ability to load game, play new game, set options, etc. Behavior is similar to that of a traditionally-installed software application, and is not necessarily limited to games.

At module 118 (FIG. 1) the software title streams data from the CD (or hard drive, if fully installed previously), as illustrated in FIG. 2G. In addition, Macrovision Safedisc may be used to check keys or other data, as necessary. At optional module 120 (FIG. 1) the executable checks Macrovision Safedisc. The file system must be intelligent enough to identify on which disc desired files are located, prompting the user to swap discs if necessary at module 122 (FIG. 1). If installed to hard drive, when the file system requests another CD, the user may, for example, enter a key sequence to go on. In this example, the key sequence may be intercepted by a driver that lets the game proceed as if another disc was inserted. Other techniques may also be used to provide multi-disc functionality.

At module 124 (FIG. 1), if the user clicks on the install-to-hard-drive option, as illustrated in FIG. 2H, the user if given the opportunity to install the streaming application onto a (usually) local hard drive. The techniques involved in handling an installed streaming application and a streaming application running from multiple CDs are similar. Each CD is equivalent to a stream file. When the application prompts for a particular CD, this is detected by requests for blocks outside the range of the currently active stream file. The streaming player would have to intercept and detect requests to change CDs.

When installing a streaming title on the hard drive, the system typically checks for adequate disk space and copies all of the streaming files to the hard drive, if space is sufficient, as illustrated in FIG. 2I. In addition, shortcuts may be created at optional module 126 (FIG. 1), window registry settings may be adjusted, and removal code for the short cuts may be added to the "Add and Remove" programs. Prompting of the user to load the CDs in a certain order may be required. Once a streaming title has been installed onto the hard drive, the user may select, for example, a shortcut to launch the streaming player and run the streaming application, as illustrated in FIG. 2J. The next time "Play Now" is selected, the cache on the hard drive can be used, as indicated at module 128 (FIG. 1).

At module 112 (FIG. 1), if the user clicks on the file-editor option, as illustrated in FIG. 2K, a file editor is launched at module 130 (FIG. 1), as illustrated in FIG. 2L. The user may gain access to specific files that can be modified or replaced. Normally, the file structure of a streamed application is hidden from the user. If an application modifies a file, this file is copied out a subdirectory, such as the directory "C:\Stream Theory\local\app_name\ . . . \file_to_be_edited".

As with application patching, the editor should be processed with the streamed application and included in the same stream file as the streamed application so that the files are visible from within the editor. When the modified file is saved, it will not go to the stream file but will be saved under the directory specified above. The editor may modify and write out files that are to be made visible to external applications. Data files may not be "unpackable" so the streaming data files may not be extracted from them in an offline manner.

At module 114 (FIG. 1), if the user clicks on the upgrade option, as illustrated in FIG. 2M, an upgrade program launches to check for and apply updates at module 132 (FIG. 1), as illustrated in FIG. 2N. Updates may include upgrades, patches, or other changes. With a streaming application patch, the upgrade Stub-program may invoke a token file that starts the patch program. The patch program may then go out onto the Web to find and retrieve any new patches. If there is a new patch, this file may be downloaded and saved to a local directory, for example, "C:\Program Files\Streamtheory\local\app_name\ . . . ". The streaming player's file system driver may check the local application directory for files that may have been updated or for files that are to be replaced with newer updates. As the application executes, the patched file will be accessed and visible to the user.

The patch program should be streamed and processed with the streaming application. This may be required if, for example, the application file structure is hidden from outside applications. File hiding may be done for security reasons, to prevent unauthorized copying of an application.

When a streaming application expects content on a CD or DVD in, for example, a CD or DVD drive, the user may be required to swap in the appropriate disc. The streaming application itself may include a token file that is encoded with information related to data that resides on a particular CD or DVD. In order to reduce the problems with making sure the proper disc is available, the CD or DVD drive can be virtualized.

Figure 3A:
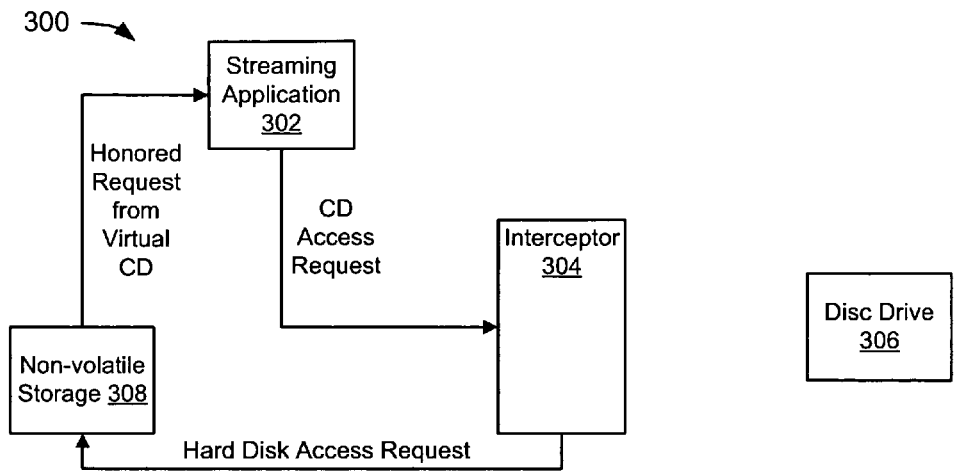
FIGS. 3A and 3B depict a conceptual system for intercepting and honoring data requests.
Figure 3B:
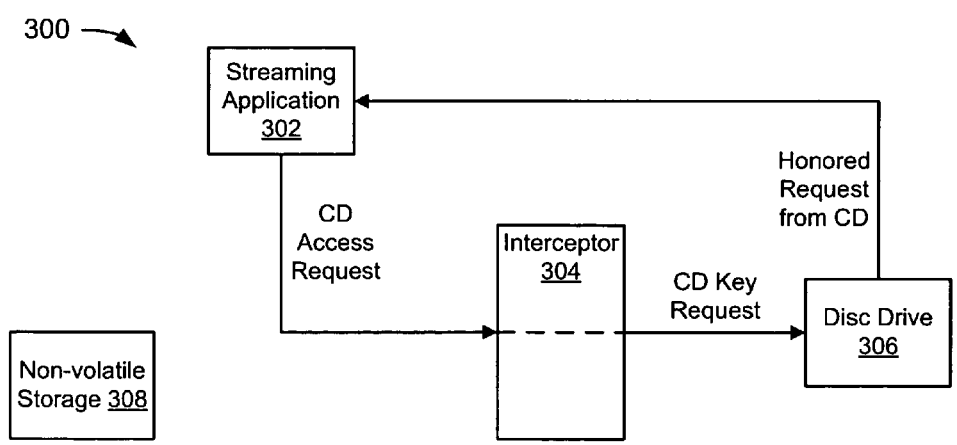

FIGS. 3A and 3B depict a conceptual system 300 for intercepting and honoring data requests. The system 300 includes a streaming application 302, interceptors 304, a disc drive 306, and non-volatile storage 308. The disc drive 306 may be a CD, DVD, or other removable storage media drive. The non-volatile storage 308 may be a hard disk drive or other type of persistent memory. Parts of any software, as is known in the art of computer software, may reside in non-volatile memory, or, for example, random access memory (RAM), especially when the software is being executed. Execution of software is typically by a processor (not shown), as is well-understood in the art of computer software.

In an embodiment, at runtime, a client puts the interceptors 304 over the disc drive 306. Where a streaming application requests data that would normally be found on a particular CD or DVD, the interceptors 304 may intercept the request and allow the request to be honored from, for example, the non-volatile storage 308, instead of accessing the CD.

In the example of FIG. 3A, in operation, the streaming application 302 makes a CD access request to the disc drive 306. The interceptors 304 intercept the request and redirect the request to the non-volatile storage 308. The non-volatile storage 308 includes data that may have been installed from the requested CD, which may or may not be located in the disc drive 306. The data may be returned from the non-volatile storage 308 (or from memory, a cache, or some other location) as a request that appears to honor the CD access request. The streaming application 302 accepts the request and uses the data accordingly.

In the example of FIG. 3B, in operation, the streaming application 302 makes a CD access request to the disc drive 306. In this example, the interceptors 304 do not intercept the request. In an embodiment, the interceptors 304 do not intercept requests that are associated with a copy protection mechanism. Accordingly, in the example of FIG. 3B, the CD access request, which for exemplary purposes is a CD key request, is honored at the disc drive 306. The honored request is returned from the CD to the streaming application 302, which accepts the request and uses the data for verification purposes. Using the technique illustrated in the examples of FIGS. 3A and 3B, requests for streaming data can be intercepted and honored from non-volatile storage (or memory), while requests for data associated with copy protection mechanisms can be honored from the CD drive.

Not all systems with disc drives will necessarily have installed data from, for example, a CD into non-volatile storage (or a memory cache). If the streaming application 302 can only obtain the requested data from the disc drive 306, then the interceptors 304 should not intercept the request. In an embodiment, a manufacturer of a CD-based copy protection mechanism could apply the protection mechanism to a CD that streams a software title. The CD-based copy protection mechanism may not be downloadable to non-volatile storage or memory. The interceptors 304 may, in this embodiment, be configured to intercept data that is downloaded from the CD, but not intercept requests associated with the CD-based copy protection mechanism.

It should be noted that not all systems have a disc drive, such as the disc drive 306. For such systems, CD-based software titles can still be downloaded remotely using a network connection, such as an Internet connection.

Advantageously, this technique is applicable even to systems that do not have a CD drive. For example, the interceptors could intercept a request for a CD drive even if no CD drive exists.

Figure 4:
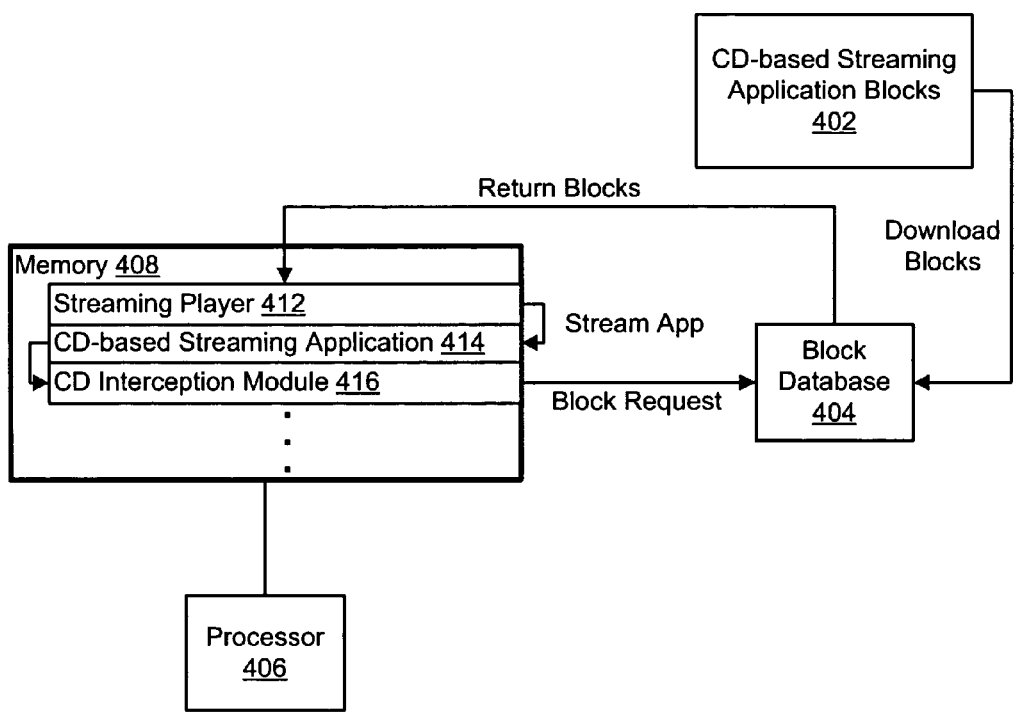
FIG. 4 depicts a system 400 for intercepting CD requests for a CD-based streaming application.

FIG. 4 depicts a system 400 for intercepting CD requests for a CD-based streaming application. Interception techniques are described in co-pending patent application Ser. No. 10/926,635 entitled "INTERCEPTION-BASED RESOURCE DETECTION SYSTEM", which is incorporated herein by reference.

The streaming software player used to stream applications, in an embodiment, may make use of a DLL that is used to determine if an FSD has been loaded or if a user has been loaded. The user should be able to stream from multiple stream files. Common files of an application must fit on one CD. The user should be able to intercept requests for new discs or the virtual equivalent for an installed to hard drive software title switching stream files.

For files installed on the hard drive, the registry should be checked for the streaming software player to determine if streaming is to be done from a CD, from the stream files stored on the hard disk, or from somewhere else. If it is desired for a streaming application to run like software that has been fully installed on disk, then that streaming application should know when it is to switch to a different stream file. The user file system driver may support a system level call to switch between stream files for this purpose. Fully installed applications, may make an application call to the FSD to change. For patch support, a user may be required to support a command line switch to invoke different executables. For software title editor support, the logic for when files are written out to a directory associated with the streaming software player, as distinguished from the software title, should be handled carefully.

A streaming application may be configured to enable reading SafeDisc data. The streamed application may be configured so that it appears as if the application is entirely installed on the C: drive whether it is running off CD or the hard drive. The problem occurs if part of the application appears to be installed on the hard drive and part on the CD. If this is the case, this fact may be captured during application processing and stored in a token file. When the application makes a request from the CD, the file system driver may intercept the request and determine if the request is valid for the application. If the request is for SafeDisc information, then the interception of the CD request by the ST FSD may cause this request to fail.

However, if the application is organized (everything appears on the C: drive) so that no data remains on the CD in the installed state, during the processing of the application this fact may be indicated in the token file. In this case, the file system driver will not intercept the calls to the CD and requests for the SafeDisc information may succeed.

This might seem confusing because where the application thinks the files are located and where the actual data is streamed from are two different things. The actual stream data could be coming from CD, the network, or the hard disc where in all these cases the files and executables all appear to be on the C: drive. Nevertheless, when the installed version of the application is transformed into a streaming format, the application does not assume that some of the data is on the CD (excluding SafeDisc data).

For a multi-CD streamed application, there are specific requirements imposed on how the code is developed and structured. In a non-streamed multi-CD game, as new files are needed that are located on different CDs, the application requests that a particular CD be inserted. The old CD is unmounted and the new CD is mounted upon CD insertion. For a streamed multi-CD game, the behavior may be somewhat different. To a streamed application, the entire directory structure for all the files appear to be present even though the actual files are not on a currently mounted CD. This is because the entire application file and directory structure has to be known at the time the application is streamified.

This causes a problem if the application tries to reference a part of the application that is not present because the CD with the stream data blocks is not present. Even though the read file appears to be available, the read will fail. Because of this, the application has this structural dichotomy that it appears as if all the files are present but the application has to be aware of when it needs to request that a different CD be inserted. Like in a non-streamed multi-CD game, the game puts up a request for the new CD to be inserted. This also implies that each CD can't have an overlapping directory structure.

Streamed applications may be structured so that the parts of the application that are common between CDs are known. The streamed application can lock these common parts into the cache or copy them to the hard drive. These files may be identified at the time the application is turned into a streamed application.

Online game play may proceed similarly to a game accessed through a CD or through a CD with formatted stream data. The access time to retrieve executables or data for a game that was traditionally executed from a CD is virtually identical to the time required to access data from a CD with stream data. This is also true for applications saved to disk. Additionally, given in this situation that none of the executables or data are accessed over the network, there is no or minimal competition for bandwidth between on-line playing data exchanges and the accesses to the hard disk or CD.

The game file system may be modified to search the hierarchy of local, hard drive, and streamed CD caches. Files may have a disc (cache) identifier. The file system may prompt the user to insert the correct disc, if necessary. The game should limit disc swapping points for simplicity; this is likely on level boundaries (at least), so the swapping happens in the user interface shell, not the running gameplay. This directory could be pre-computed before hand and be an additional data file on the CD. Handling multiple discs will require duplicated data on each disc; this could impact overall media space requirements negatively. Possible alternatives to address this are to always do a partial install to the hard disc, installing shared components rather than duplicating them in the stream theory buffers on separate discs.

Figure 5:
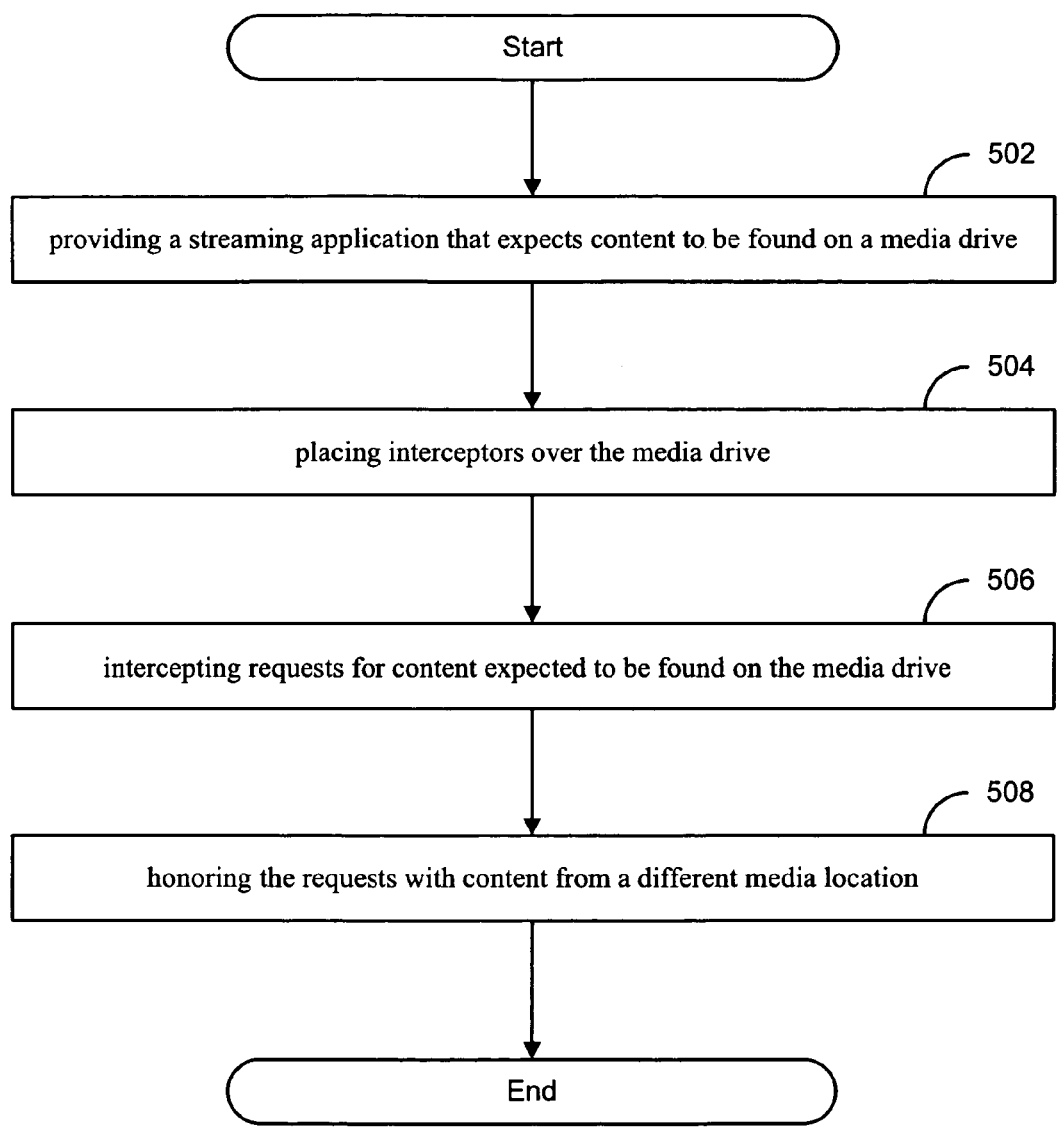
FIG. 5 depicts a flowchart of a process for streaming from a media drive.

FIG. 5 depicts a flowchart 500 of a process for streaming from a media drive. In the example of FIG. 5, the flowchart 500 starts at module 502 where a streaming application that expects content to be found on a media drive is provided. The flowchart 500 continues at module 504 where interceptors are placed over the media drive, and at module 506 where requests for content expected to be found on the media drive are intercepted. The flowchart 500 ends at module 508 where the requests are honored with content from a different media location.

Figure 6:
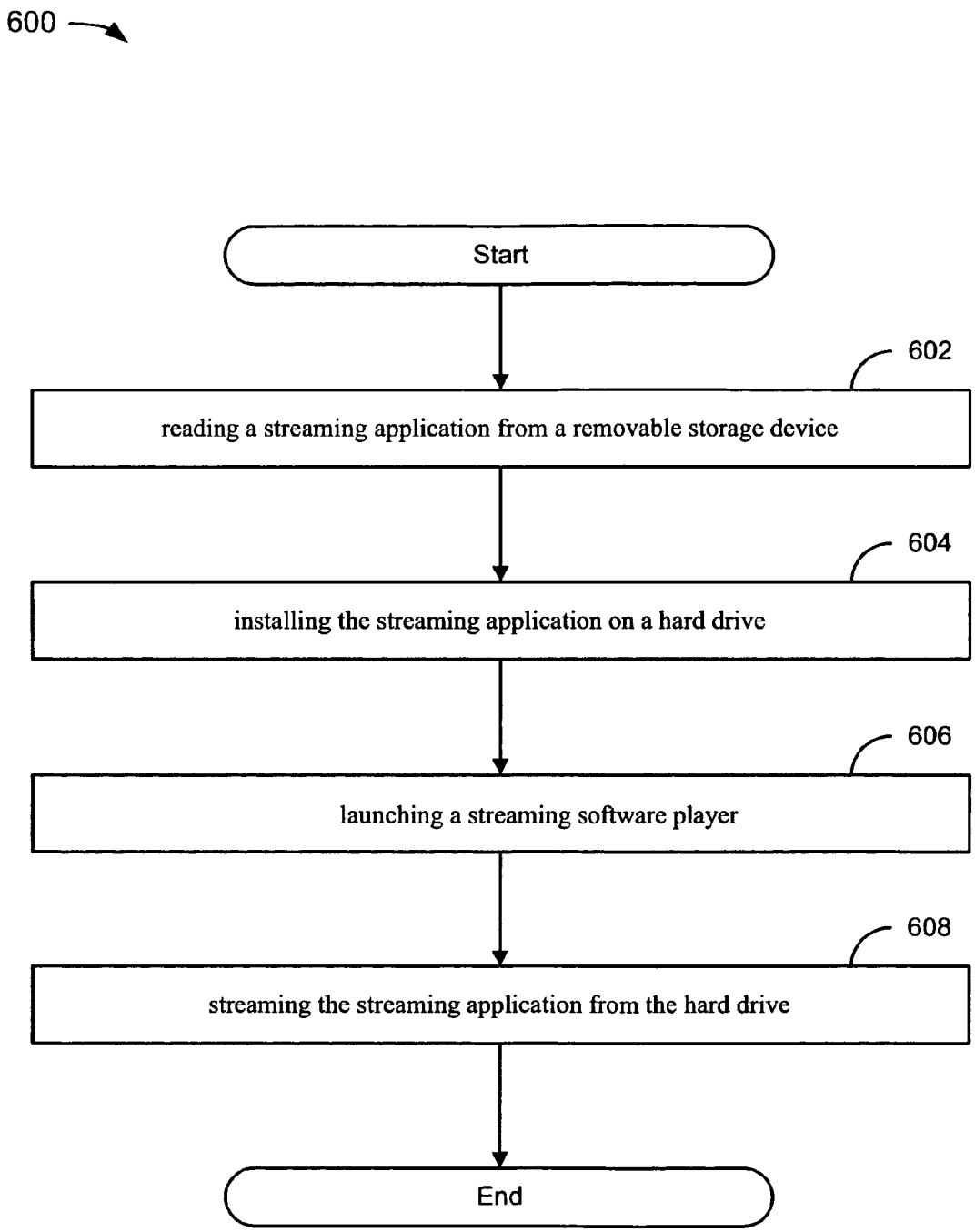
FIG. 6 depicts a flowchart of a process for streaming from a media drive.

FIG. 6 depicts a flowchart 600 of a process for streaming from a media drive. In the example of FIG. 6, the flowchart 600 starts at module 602 where a streaming application is read from a removable storage device. The flowchart 600 continues at module 604 where the streaming application is installed on a hard drive, and at module 606 where a streaming software player is launched. The flowchart 600 ends at module 608 where the streaming application is streamed from the hard drive.

Figure 7:
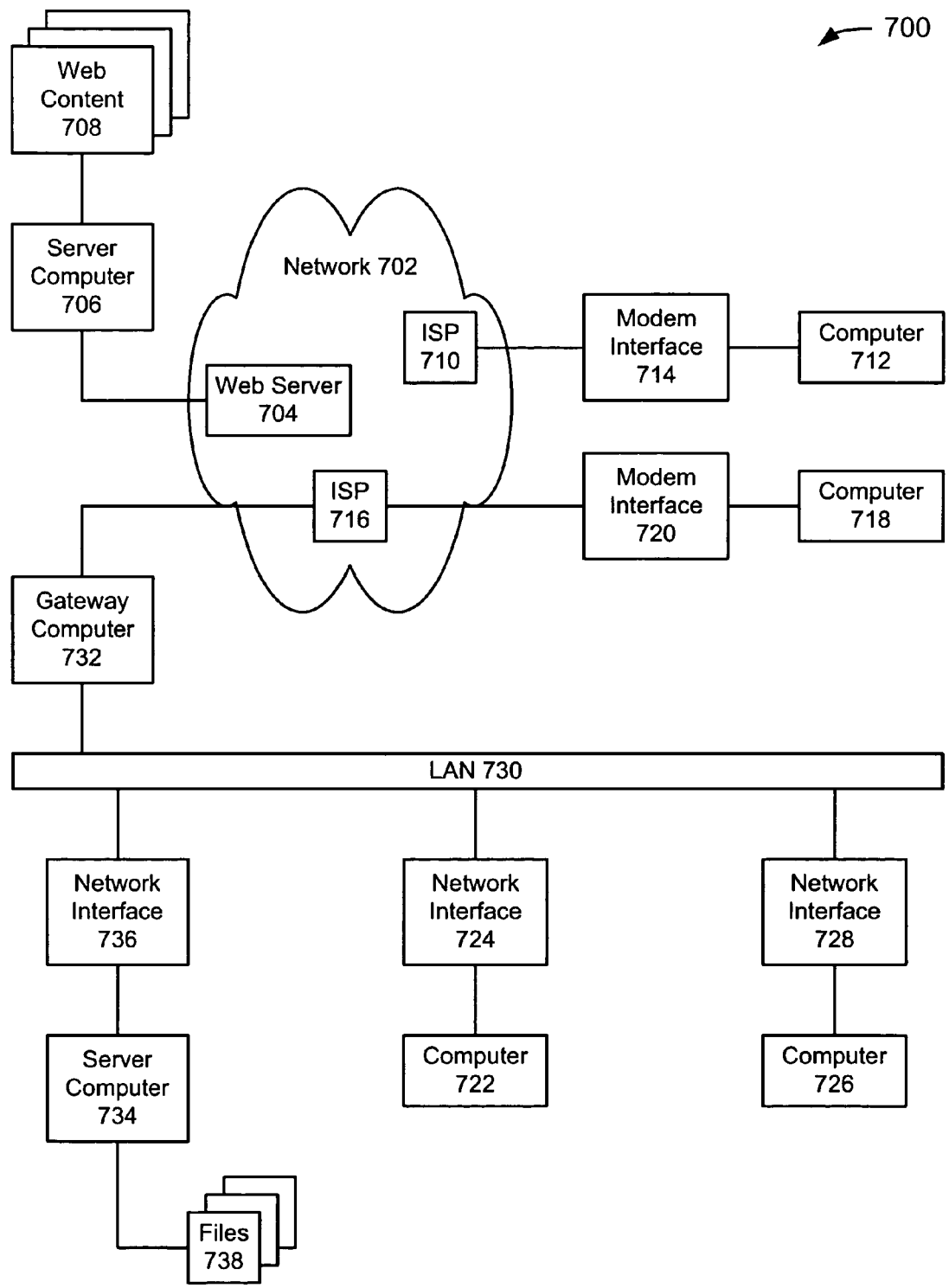
FIG. 7 depicts a system for use with the methods described herein.
Figure 8:
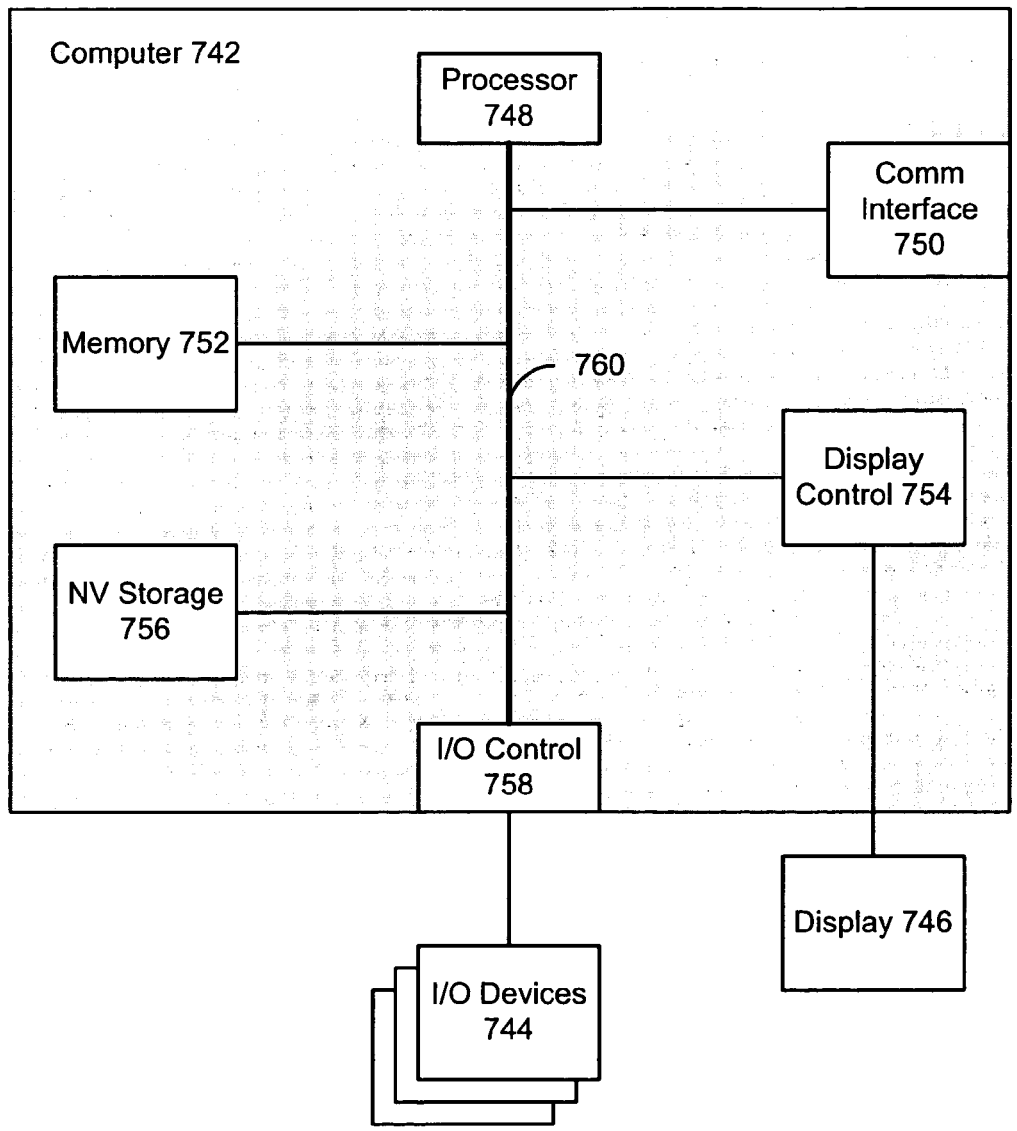
FIG. 8 depicts a device for use with the system of FIG. 7.

The following description of FIGS. 7 and 8 is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 704 is typically at least one computer system which operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a form of a media database. While two computer systems 704 and 706 are shown in FIG. 7, the web server system 704 and the server computer system 706 can be one computer system having different software components providing the web server functionality and the server functionality provided by the server computer system 706, which will be described further below.

Access to the network 702 is typically provided by Internet service providers (ISPs), such as the ISPs 710 and 716. Users on client systems, such as client computer systems 712, 718, 722, and 726 obtain access to the Internet through the ISPs 710 and 716. Access to the Internet allows users of the client computer systems to exchange information, receive and send e-mails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. The client computer system can be a personal computer system, a network computer, a web TV system, or other computer system. While FIG. 7 shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be Ethernet network or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 8 depicts a computer system 740 for use in the system 700 (FIG. 7). The computer system 740 may be a conventional computer system that can be used as a client computer system or a server computer system or as a web server system. Such a computer system can be used to perform many of the functions of an Internet service provider, such as ISP 710 (FIG. 7). In the example of FIG. 8, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. The communications interface can be an analog modem, isdn modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with conventional well known technology.

The non-volatile storage 756 is often a magnetic hard disk, an optical disk, or another form of storage for large amounts of data. Some of this data is often written, by a direct memory access process, into memory 752 during execution of software in the computer 742. One of skill in the art will immediately recognize that the terms "machine-readable medium" or "computer-readable medium" includes any type of storage device that is accessible by the processor 748 and also encompasses a carrier wave that encodes a data signal.

Objects, methods, inline caches, cache states and other object-oriented components may be stored in the non-volatile storage 756, or written into memory 752 during execution of, for example, an object-oriented software program. In this way, the components illustrated in, for example, FIGS. 1-3 and 6 can be instantiated on the computer system 740.

The computer system 740 is one example of many possible computer systems which have different architectures. For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 752 for execution by the processor 748. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A method, comprising:
   receiving a notification that a removable storage device was inserted into a host device, the removable storage device including programs associated with a streaming application capable of streaming one or more blocks to a streaming software player on the host device;
   running one or more of the programs on the host device in response to the notification;
   ensuring that a streaming software player is installed on the host device;
   providing from the streaming software player a request for one or more blocks related to streaming-related activity associated with the streaming application, the request for the one or more blocks provided to the removable storage device;
   intercepting from the removable storage device the one or more blocks of the streaming application, the one or more blocks intercepted by the streaming software player;
   receiving a request to access an application feature or a resource of the streaming application;
   honoring, using the streaming software player, the request to access the application feature or the resource with the one or more blocks of the streaming application.

2. The method of claim 1, further comprising running the streaming software player.

3. The method of claim 1, further comprising accessing data from the removable storage device necessary to stream the software application using the streaming software player.

4. The method of claim 1, further comprising accessing data from a local cache necessary to stream the software application using the streaming software player.

5. The method of claim 1, further comprising checking for updates to a streaming application.

6. The method of claim 1, further comprising running an update program that is processed in files associated with the streaming application to find updates for the streaming application.

7. The method of claim 1, further comprising applying updates to the streaming application automatically.

8. The method of claim 1, further comprising launching a file editor associated with a streaming application.

9. The method of claim 1, further comprising receiving modifications to files associated with the streaming application.

10. The method of claim 9, further comprising saving the modified files to a subdirectory that resides beneath a streaming software player, wherein the streaming software player uses the modified files instead of original files when streaming the streaming application.

11. The method of claim 1, further comprising providing a streaming application that expects content to be found on a media drive.

12. The method of claim 11, further comprising placing interceptors over the media drive.

13. The method of claim 11, further comprising intercepting requests for content expected to be found on the media drive.

14. The method of claim 11, further comprising intercepting requests for content expected to be found on the media drive and honoring the requests with content from a different media location.

15. A method, comprising:
receiving an instruction to read a streaming application from a removable storage device;
storing at least a portion of the streaming application on a hard drive of a host device operatively coupled to the removable storage device;
launching a streaming software player on the host device;
streaming the streaming application from the hard drive using the streaming software player;
intercepting at the streaming software player a request to access an application feature or a resource of the streaming application;
honoring, using the streaming software player, the request to access the application feature or the resource with the one or more blocks of the streaming application.

16. The method of claim 8, further comprising checking for updates to a streaming application.

17. The method of claim 8, further comprising running an update program that is processed in files associated with the streaming application to find updates for the streaming application.

18. The method of claim 8, further comprising applying updates to the streaming application automatically.

19. A system, comprising:
means for receiving an instruction to read a streaming application from a removable storage device;
means for storing at least a portion of the streaming application on a hard drive of a host device operatively coupled to the removable storage device;
means for launching a streaming software player on the host device;
means for streaming the streaming application from the hard drive using the streaming software player;
means for at the streaming software player a request to access an application feature or a resource of the streaming application;
means for honoring, using the streaming software player, the request to access the application feature or the resource with the one or more blocks of the streaming application.

20. The system of claim 19, further comprising means for applying automatic updates to the streaming application.

* * * * *